(12) United States Patent
Merheb et al.

(10) Patent No.: US 10,274,116 B2
(45) Date of Patent: Apr. 30, 2019

(54) ENVIRONMENTAL CONDITIONING SYSTEMS AND METHODS UTILIZING POLYVINYLIDENE FLUORIDE (PVDF) FOAM DUCTS

(71) Applicant: The Boeing Company, Chicago, IL (US)

(72) Inventors: Federico Merheb, Rockledge, FL (US); Orlando Torres, Rockledge, FL (US); Nicholas W. Newell, Orlando, FL (US); Donald C. Barnes, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 450 days.

(21) Appl. No.: 15/011,171

(22) Filed: Jan. 29, 2016

(65) Prior Publication Data

US 2017/0219136 A1 Aug. 3, 2017

(51) Int. Cl.
| | | |
|---|---|---|
| *F16L 3/00* | (2006.01) | |
| *F16L 27/11* | (2006.01) | |
| *B64G 1/00* | (2006.01) | |
| *F16L 59/14* | (2006.01) | |
| *F16L 3/01* | (2006.01) | |
| *F16L 3/10* | (2006.01) | |
| *F16L 3/18* | (2006.01) | |
| *F16L 9/12* | (2006.01) | |
| *F16L 9/21* | (2006.01) | |
| *F17D 1/00* | (2006.01) | |
| *F16L 51/02* | (2006.01) | |

(52) U.S. Cl.
CPC .............. *F16L 27/11* (2013.01); *B64G 1/00* (2013.01); *F16L 3/01* (2013.01); *F16L 3/10* (2013.01); *F16L 3/18* (2013.01); *F16L 9/12* (2013.01); *F16L 9/21* (2013.01); *F16L 51/025* (2013.01); *F16L 59/143* (2013.01); *F17D 1/00* (2013.01)

(58) Field of Classification Search
CPC ..................................... F16L 11/125
USPC ................. 138/106, 119, 120, 149, 155
See application file for complete search history.

(56) References Cited

U.S. PATENT DOCUMENTS

| | | | | |
|---|---|---|---|---|
| 2,960,924 A | * | 11/1960 | Grott | F24F 1/04 138/119 |
| 4,003,210 A | * | 1/1977 | Bostroem | F16L 1/026 138/149 |
| 4,351,366 A | * | 9/1982 | Angioletti | F16L 59/153 138/122 |
| 5,324,557 A | * | 6/1994 | Lupke | B29C 47/0023 138/121 |

(Continued)

*Primary Examiner* — James F Hook
(74) *Attorney, Agent, or Firm* — Haynes and Boone, LLP

(57) ABSTRACT

Systems and methods according to one or more embodiments are provided for providing a durable and thermally insulated duct network. A duct network may be provided by coupling two or more foam ducts to each other. In one example, a system includes a plurality of foam ducts and a plurality of foam bellows configured to couple the foam ducts to each other. The foam bellows include one or more bellow folds to allow an expansion and contraction of the foam ducts. A plurality of structural fastening systems couple the duct network to a structure of a vessel. The structural fastening systems allow for an axial movement of the duct network as the foam ducts expand and contract. Additional systems and methods are also provided.

20 Claims, 15 Drawing Sheets

(56) References Cited

U.S. PATENT DOCUMENTS

| | | | | |
|---|---|---|---|---|
| 5,653,265 A * | 8/1997 | Nakagawa | ........... | B29C 47/0023 |
| | | | | 138/120 |
| 5,682,924 A * | 11/1997 | Powell | ............... | B29C 45/14598 |
| | | | | 138/109 |
| 5,975,143 A * | 11/1999 | Jarvenkyla | ............... | B29C 53/30 |
| | | | | 138/121 |
| 6,119,731 A * | 9/2000 | Nakagawa | ............... | B29C 49/04 |
| | | | | 138/121 |
| 6,425,417 B1 * | 7/2002 | Paschke | .............. | F24F 13/0218 |
| | | | | 138/106 |
| 8,245,733 B2 * | 8/2012 | Renaud | ..................... | F16L 3/06 |
| | | | | 138/106 |
| 8,833,706 B2 * | 9/2014 | Elsmore | ................... | H02G 3/32 |
| | | | | 138/106 |
| 2004/0060609 A1 * | 4/2004 | Fatato | ................... | B29C 44/105 |
| | | | | 138/121 |
| 2004/0074554 A1 * | 4/2004 | Starita | ................ | B29C 44/0492 |
| | | | | 138/137 |
| 2008/0035228 A1 * | 2/2008 | Bentley | ................... | B29C 44/22 |
| | | | | 138/127 |
| 2008/0308674 A1 | 12/2008 | Frantz et al. | | |
| 2010/0021795 A1 * | 1/2010 | Takeshita | .............. | F16L 3/1091 |
| | | | | 429/425 |
| 2010/0040934 A1 * | 2/2010 | Perry | ..................... | F16L 51/00 |
| | | | | 429/454 |
| 2011/0056581 A1 * | 3/2011 | Diels | ..................... | F16L 11/111 |
| | | | | 138/120 |
| 2012/0012218 A1 * | 1/2012 | Sabadie | .................. | B64C 1/066 |
| | | | | 138/106 |
| 2013/0276959 A1 | 10/2013 | Frantz et al. | | |
| 2016/0377313 A1 * | 12/2016 | Leiterman | ........... | F24F 13/0236 |
| | | | | 454/296 |

\* cited by examiner

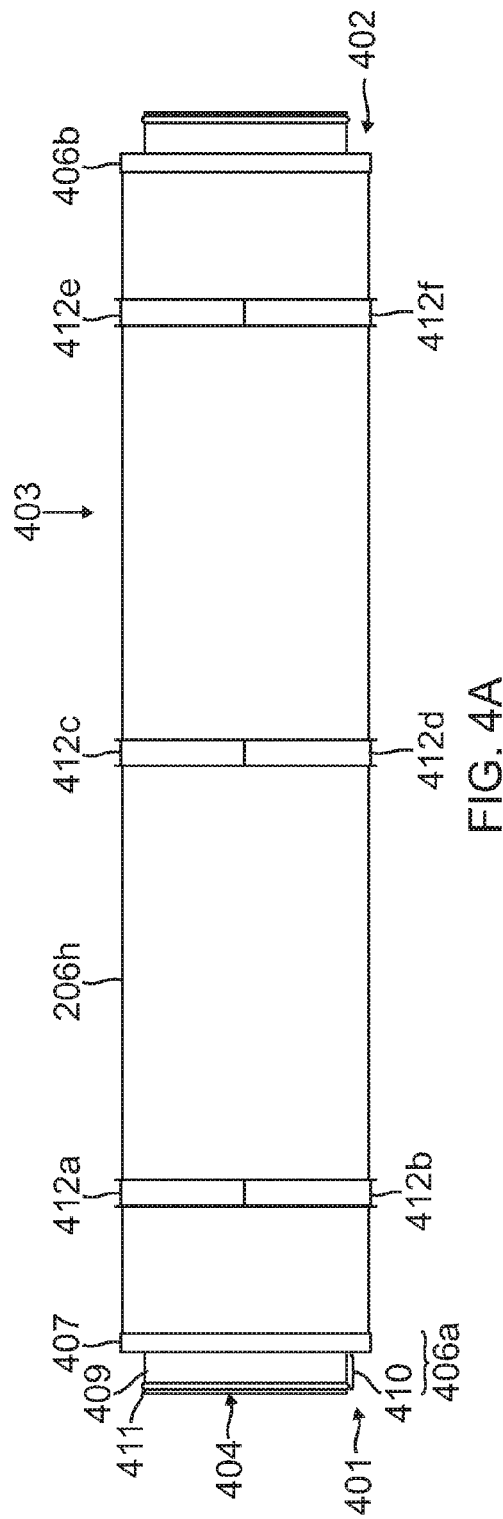
FIG. 4A
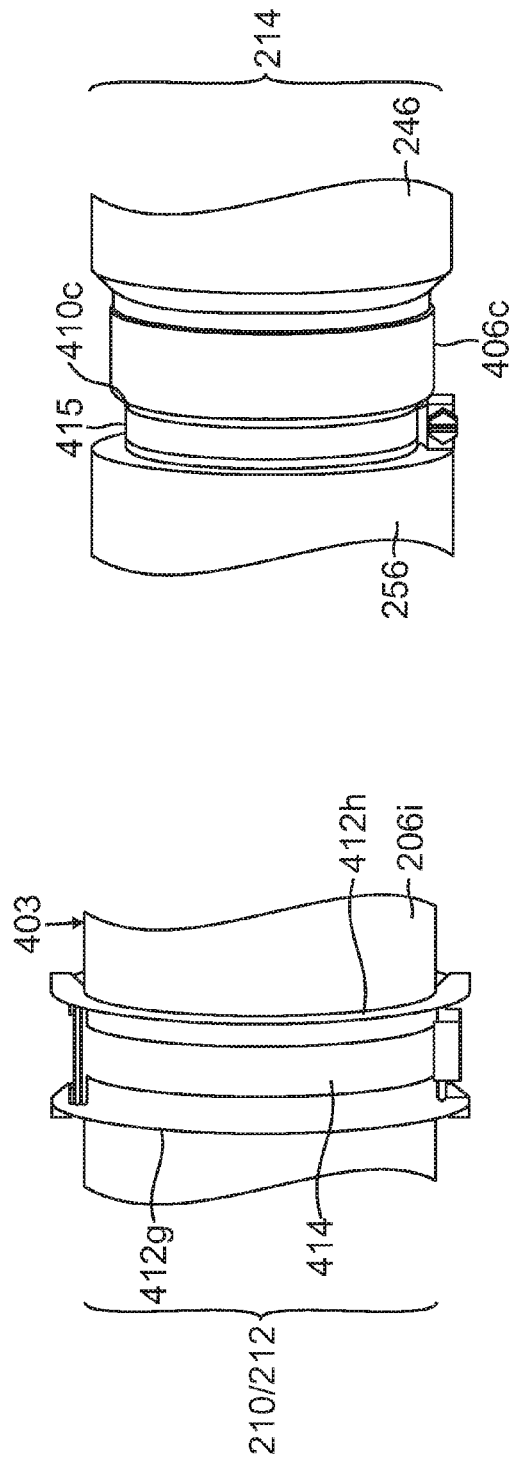
FIG. 4B
FIG. 4C

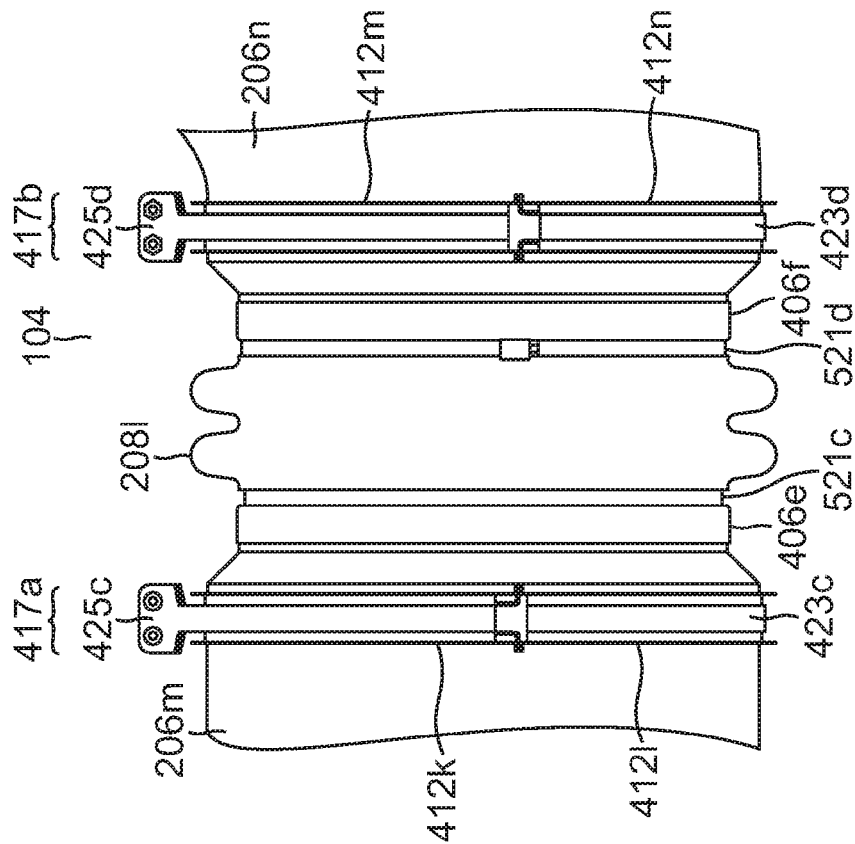
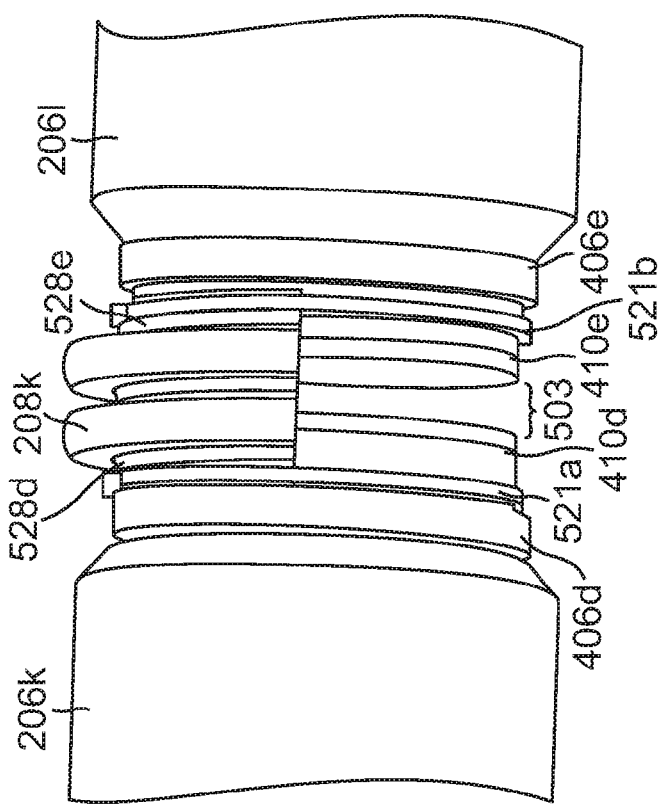
FIG. 5C
FIG. 5B

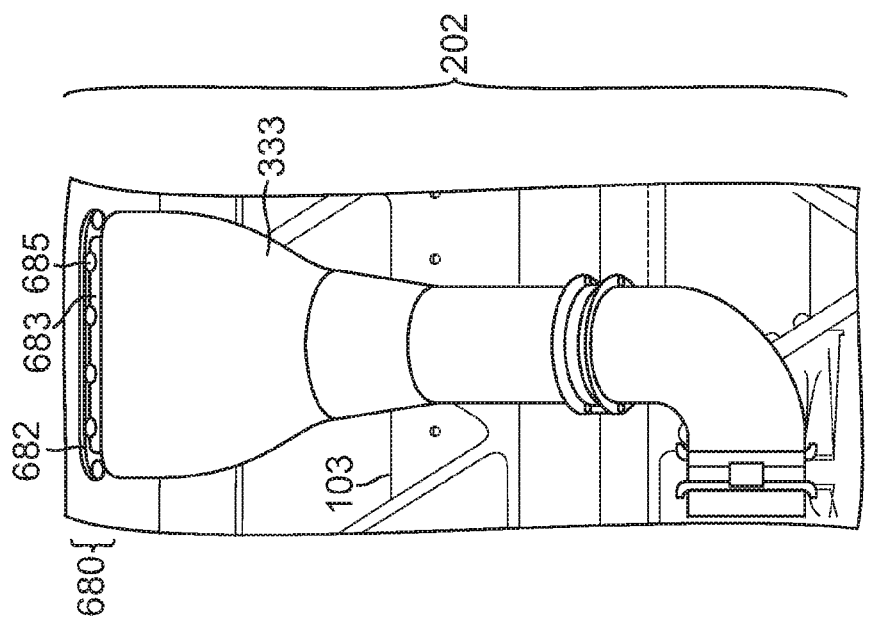
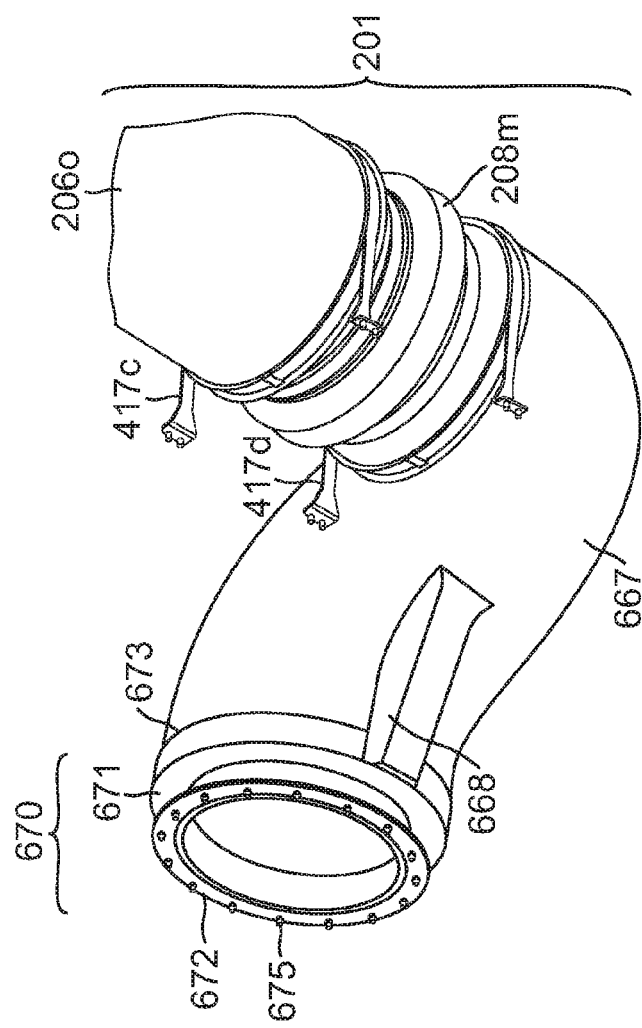
FIG. 6A
FIG. 6B

ENVIRONMENTAL CONDITIONING SYSTEMS AND METHODS UTILIZING POLYVINYLIDENE FLUORIDE (PVDF) FOAM DUCTS

STATEMENT REGARDING FEDERALLY SPONSORED RESEARCH OR DEVELOPMENT

This invention was made with Government support under contract number NNM07AB03C awarded by the National Aeronautics and Space Administration (NASA). The Government has certain rights in this invention.

TECHNICAL FIELD

One or more embodiments relate generally to duct systems providing a gas media distribution and, more particularly, for example, to a durable, thermally insulated lightweight foam duct system.

BACKGROUND

In the field of duct systems such as to provide a gas media distribution in an aerospace environmental conditioning system (ECS), there is an ongoing effort to improve thermal insulation and reduce weight of the duct system. Conventional duct systems used for ECS rely on composite materials. Composite materials provide reasonable strength-to-weight performance. However, composite materials offer inadequate thermal insulation resulting in inefficient delivery of thermal conditioning to targeted areas or components. Conventional techniques to improve thermal insulation rely on adding layers of material. However, complex and time consuming fabrication processes and hardware may be required to add layers. Furthermore, additional layers of material increase the weight of the environmental conditioning system. Thus, there is a need for duct system solutions that provides performance or other advantages over conventional duct systems.

SUMMARY

Systems and methods are disclosed herein in accordance with one or more embodiments that provide an improved approach to forming a durable and lightweight duct network to distribute a gas media within an aerospace vessel.

In one embodiment, a system includes a duct network comprising a plurality of foam ducts configured to distribute a gas media; a plurality of bellows configured to couple the foam ducts to each other to form the duct network; and a plurality of structural fastening systems configured to couple the foam ducts and/or bellows to a support structure.

In another embodiment, a method of providing a duct network includes providing a plurality of foam ducts; providing a plurality of bellows; providing a plurality of structural fastening systems; coupling the foam ducts to each other using the bellows; and coupling the foam ducts and/or bellows to a support structure using the structural fastening systems.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 4A illustrates a support ring fastening system coupled to an outer surface of a foam duct in accordance with an embodiment of the disclosure.

FIG. 4B illustrates a structural slip-fit fastening system and a structural fixed fastening system in accordance with an embodiment of the disclosure.

FIG. 4C illustrates a duct connection fastening system in accordance with an embodiment of the disclosure.

FIG. 5B illustrates a bellows coupled to two foam ducts in accordance with an embodiment of the disclosure.

FIG. 5C illustrates a bellows coupled to a support structure in accordance with an embodiment of the disclosure.

FIG. 6A illustrates a foam duct flanged installation configuration in accordance with an embodiment of the disclosure.

FIG. 6B illustrates a panel flange installation configuration in accordance with an embodiment of the disclosure.

DETAILED DESCRIPTION

Figure 1:
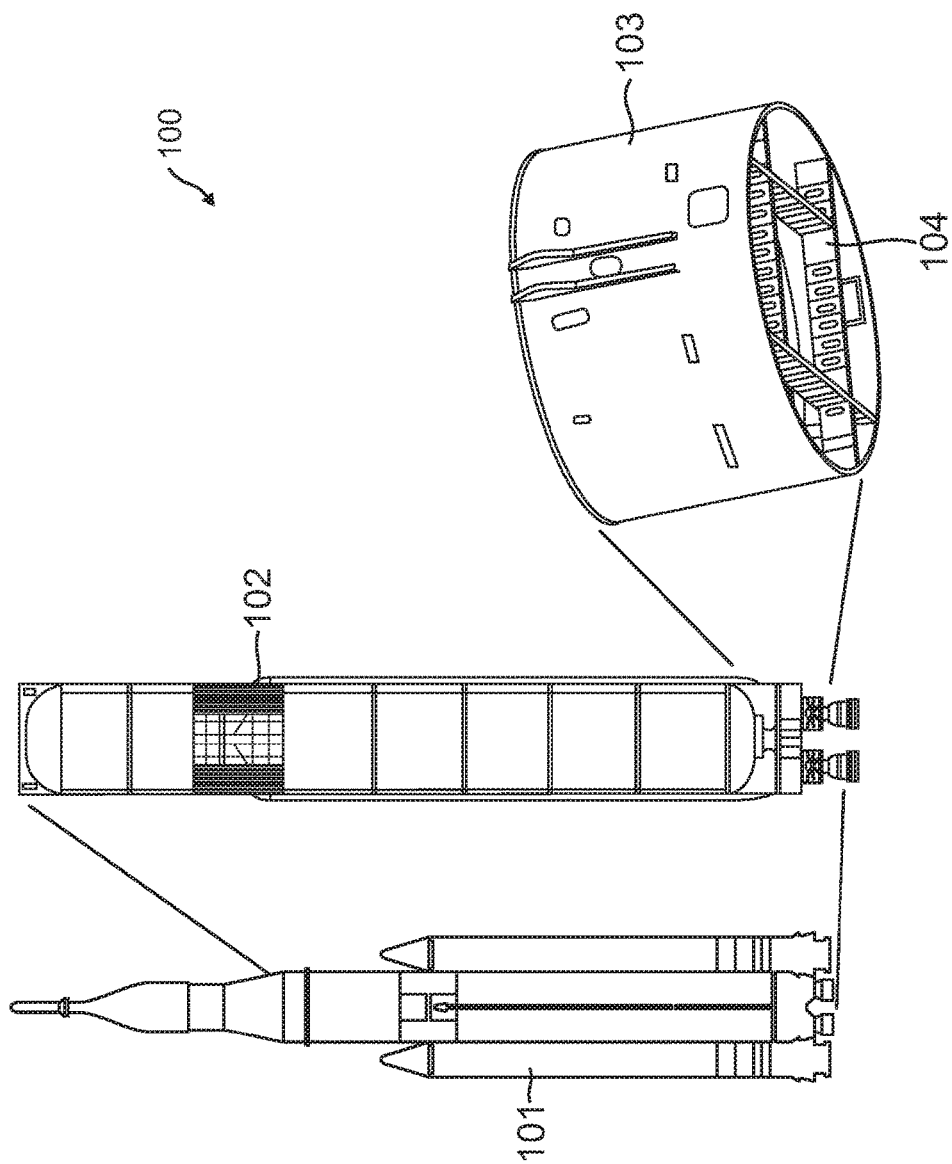
FIG. 1 illustrates a diagram of an aerospace vessel in accordance with an embodiment of the disclosure.

Techniques are provided to form a durable and lightweight duct network to distribute a gas media. In some embodiments gas media may include any type of gas, for example, air, nitrogen, and/or other gases, such as one or more inert gases. In some embodiments, gas media may be a conditioned gas media. Conditioned gas media may represent a thermally cooled, heated, and/or humidity controlled gas media. In other embodiments, gas media may be an unconditioned gas media. In some embodiments, a duct network is implemented as two or more foam ducts joined together and coupled to a support structure of an aerospace vessel, for example. In one example, the foam ducts are cylindrical in shape and may include thick sidewalls to provide a thermal insulation for the gas media distributed therein. Foam bellows may couple the ducts to each other. The foam bellows may be formed into a convoluted cylindrical shape to provide for a thermal expansion and contraction of the ducts. Foam ducts expand and contract when exposed to temperature extremes during an atmospheric transition of the aerospace vessel. The foam ducts and bellows may be formed from a lightweight polyvinylidene fluoride (PVDF) material with a low thermal conductivity providing for good thermal insulation. Angled orifices may be formed on surfaces of the ducts to effectively direct the gas media flow along the duct network.

The ducts and/or bellows may be coupled to the support structure with one or more structural fixed and/or slip support ring fastening systems. Fixed support ring fastening systems may couple foam ducts to the support structure and restrain movement of the duct in a radial and axial direction. In some embodiments, structural fixed fastening systems may include one or more support rings, tie straps, bonding adhesive material and/or clamps. Slip support ring fastening systems may couple foam ducts to the support structure and allow for movement in an axial direction to allow expansion and contraction of the duct during temperature cycling. In some embodiments, structural slip fastening systems may include one or more support rings, tie straps, bonding adhesive material and/or clamps.

Advantages of the improved duct network include the use of PVDF foam ducts with good thermal insulation providing for gas media distribution without an increase in weight. Implementing PVDF ducts in extreme thermal and vibration environments as experienced in aerospace vessels requires improved design and installation configurations. Impact of thermal stresses in the PVDF foam due its high coefficient of thermal expansion and extreme temperatures may be minimized by including convoluted foam bellows to facilitate thermal expansion and contraction. Structural fixed and slip fastening systems ensure adequate restraint of the duct network while allowing thermal expansion and contraction of the PVDF ducts. Furthermore, angled orifices sized and formed into the duct sidewalls act as integrated guide vanes for directing gas media flow toward desired components.

FIG. 1 illustrates a diagram of an aerospace vessel 100 in accordance with an embodiment of the disclosure. As shown in FIG. 1, aerospace vessel 100 may include a launch vehicle 101, a core stage 102, and an engine section 103. In some embodiments, aerospace vessel may be used to lift payloads beyond earth's immediate atmosphere. Engine section 103 may include electronics and electrical units to provide engine control, rocket guidance, and telemetry monitoring, for example. Electronics and electrical units may be thermally conditioned during test and verification operations in preparation for launch. In this regard, a duct network may be used to distribute a gas media to electronics and electrical units within engine section 103. Engine section may include a support structure 104. Support structure 104 may couple electrical circuits, electronic units, and a duct network to engine section 103.

A duct network and components integrated within engine section 103 may be exposed to extreme accelerations caused by atmospheric buffeting or oscillations, rocket thrust, and gravity during lift-off and ascent. Further, duct network and components may undergo extreme rapid changes in temperatures and/or air pressure. While duct network may not be operational during launch and ascent, it may need to survive atmospheric extremes so not to break apart and generate debris-induced failures. Other embodiments of an aerospace vessel may include an airplane, a helicopter, a blimp, a spacecraft and/or other airborne vehicles.

Figure 2:
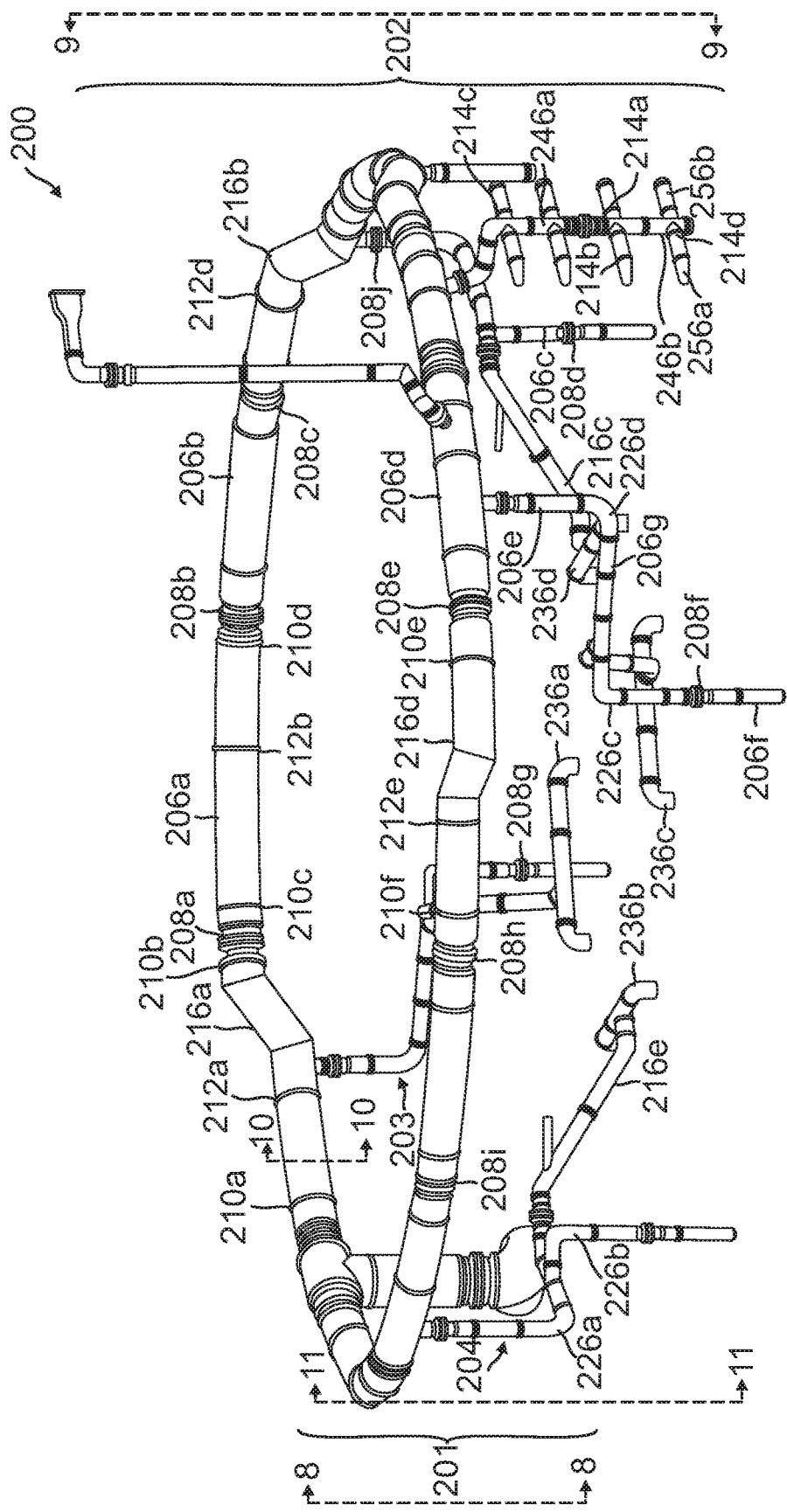
FIG. 2 illustrates a duct network in accordance with an embodiment of the disclosure.

FIG. 2 illustrates a duct network 200 in accordance with an embodiment of the disclosure. As shown in FIG. 2, duct network 200 includes a gas media intake section 201. The intake section 201 may be implemented to receive, for example, gaseous nitrogen from an external source to distribute to components within engine section 103. In other embodiments, the intake section 201 may be implemented to receive conditioned air to distribute to components within engine section 103.

In some embodiments, duct network 200 includes an avionics thermal conditioning section 202. Avionics conditioning section may provide gas media to one or more shelves of electrical circuits and/or electronic units, as described herein. In some embodiments, duct network 200 includes an engine controller thermal conditioning section 203 configured to provide gas media to electrical circuits and/or electronic units used for engine thrust control and telemetry, among other operations. In some embodiments, duct network 200 includes an electronics thermal conditioning section 204 configured to distribute gas media to engine section 103.

As shown in FIG. 2, duct network 200 includes a plurality of foam ducts configured to distribute a gas media. Foam ducts may be formed in shapes to effectively utilize space and efficiently distribute gas media to components within engine section 103. In this regard, foam ducts may be formed in a plurality of shapes, such as a straight foam duct 206, an inclined foam duct 216, an elbow foam duct 226, a U shaped foam duct 236, an H shaped foam duct 246, and an L shaped foam duct 256, for example. In some embodiments, foam ducts may be formed in complex shapes such as a thermal conditioning panel foam duct (e.g., such as thermal conditioning panel foam duct 333 of FIG. 3C) and a tee foam duct (e.g., such as tee foam duct 845 of FIG. 8). In some embodiments, foam ducts may be formed from a polyvinylidene fluoride (PVDF) material to provide for thermal insulation and light weight. In some embodiments, PVDF foam ducts 206, 216, 226, 236, 246, and 256 may be formed in a cylindrical shape with an inner diameter approximately one and one-half inches to ten inches and an outer diameter approximately two and one-half inches to twelve inches. Furthermore, PVDF foam ducts 206, 216, 226, 236, 246, and 256 may be formed with a sidewall thickness approximately one-half inch to one inch.

In other embodiments, foam ducts 206, 216, 226, 236, 246, and 256 may be formed with an inner diameter less than one and one-half inches and greater than ten inches. Foam ducts 206, 216, 226, 236, 246, and 256 may be formed with an outer diameter less than two and one-half inches and greater than twelve inches. Foam ducts 206, 216, 226, 236, 246, and 256 may be formed with sidewall thickness less than one-half inch and greater than one inch. For example, one inch sheets of PVDF foam material may be be layered and adhesively bonded and/or thermobonded to form a sheet of PVDF material greater than one inch thick. Cylindrical foam ducts may be formed from the bonded PVDF sheets including a sidewall thickness greater than one inch.

As shown in FIG. 2, foam ducts may include straight foam ducts 206 (individually labeled as 206a through 206g), inclined foam ducts 216 (individually labeled as 216a through 216e), elbow foam ducts 226 (individually labeled as 226a through 226d), U shaped foam ducts 236 (individually labeled as 236a through 236d), H shaped foam ducts 246a and 246b, and L shaped foam ducts 256 (individually labeled as 256a and 256b) used to form duct network 200.

In some embodiments, elbow foam ducts 226 include a single forty-five degree and/or ninety degree elbow. In other embodiments, elbow foam ducts 226 include one or more forty-five degree and/or ninety degree elbows. In yet another embodiment, elbow foam ducts 226 include angled elbows greater than and/or less than ninety degrees.

A plurality of bellows 208 (individually labeled as 208a through 208j) may be configured to couple the foam ducts (e.g., foam ducts 206, 216, 226, 236, 246, and 256) to each other to form duct network 200. In some embodiments, bellows 208 may be formed from a polyvinylidene fluoride (PVDF) material. A plurality of structural slip-fit fastener systems 210 (individually labeled as 210a through 210f) and structural fixed fastener systems 212 (individually labeled as 212a through 212e) may be configured to couple foam ducts to support structure 104.

Duct network 200 including PVDF foam bellows 208 and PVDF foam ducts 206, 216, 226, 236, 246, and 256 with good thermal insulation provides for gas media distribution without an increase in weight to aerospace vessel 100. The effects of thermal expansion and contraction of PVDF foam ducts due to high coefficient of thermal expansion and extreme temperatures of aerospace vessels, such as in the engine section 103, may be minimized by foam bellows 208. Structural slip-fit fastening systems 210 and structural fixed fastening systems 212 ensure adequate restraint of duct network 200 while allowing thermal expansion and contraction of PVDF foam ducts 206, 216, 226, 236, 246, and 256.

Figures 3A, 3B:
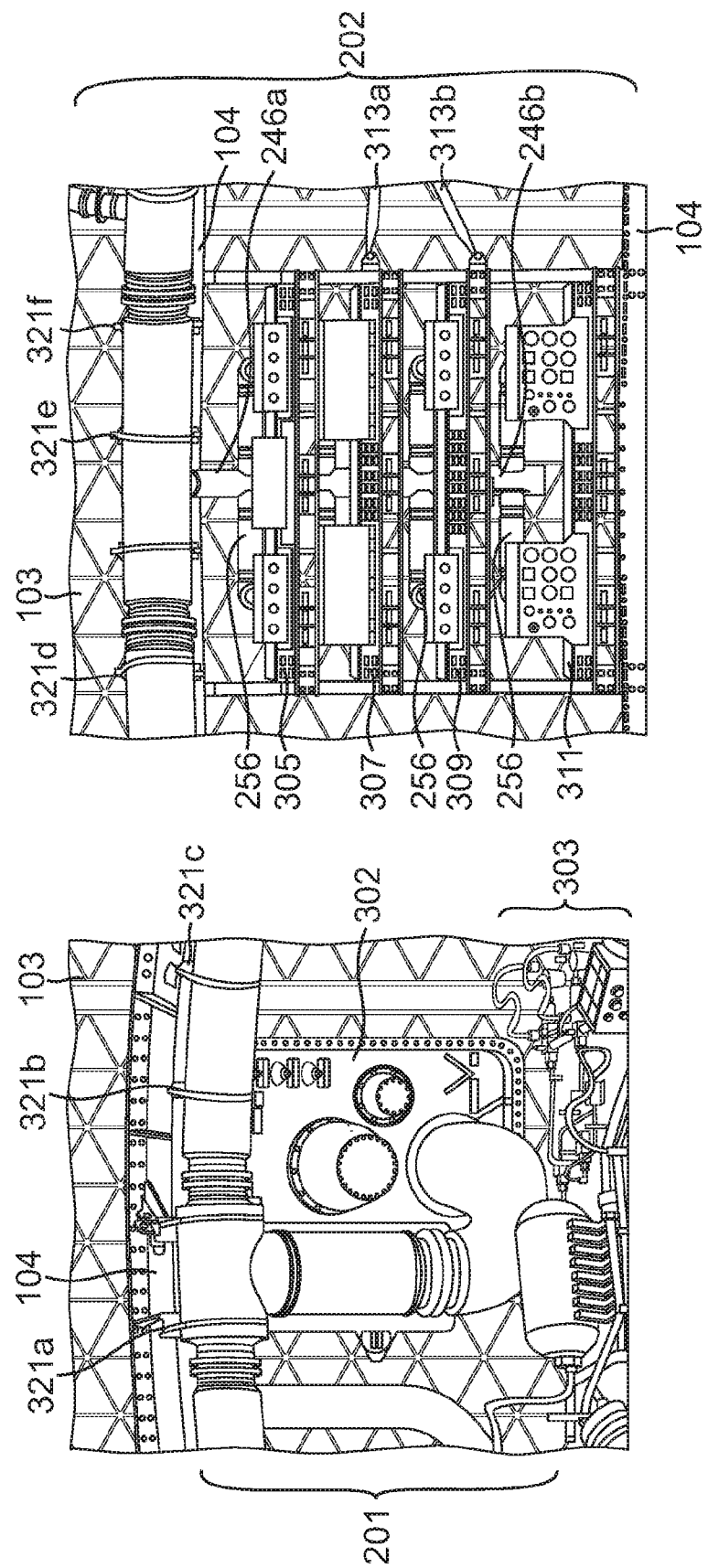
FIGS. 3A-3C illustrate views of a duct network and engine section components in accordance with embodiments of the disclosure.
Figure 3C:
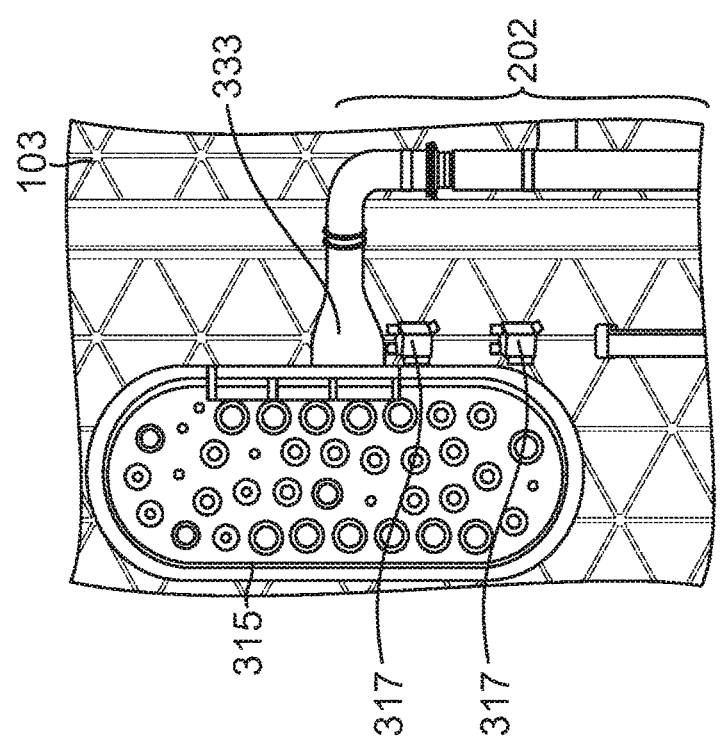

FIGS. 3A-3C illustrate views of a duct network 200 and engine section components in accordance with embodiments of the disclosure. As shown in FIG. 3A, gas media intake section 201 may be coupled to an engine section 103 purge quick disconnect 302 at a duct flange fastening system (e.g., such as duct flange fastening system 670 of FIG. 6A). In this regard, gas media (e.g., conditioned and/or unconditioned air, and/or gaseous nitrogen) enters engine section 103 via purge quick disconnect 302. The intake section 201 may receive gas media from purge quick disconnect 302 to distribute gas media throughout duct network 200.

A plurality of tangential support brackets 321 (individually labeled 321a through 321f) may be mechanically coupled to support structure 104. Gas media intake section 201 may be coupled to each of corresponding tangential support brackets 321, as described herein. Engine section platform 303 may include a plurality of electrical components, wiring harnesses, and electronic units configured to control and guide aerospace vessel 100. Engine controller thermally conditioning section 203 may be configured to distribute gas media to engine section platform 303, as described herein.

In the embodiment shown in FIG. 3B, avionics cooling section 202 may be configured to provide gas media to one or more shelves of avionics electronic equipment. In the embodiment shown in FIG. 3B, avionics electronic equipment includes shelf 305, shelf 307, shelf 309, and shelf 311. In this regard, H shaped foam duct 246a coupled to four L shaped foam ducts 256 may provide gas media to avionics electronic equipment shelves 305, and 307. H shaped foam duct 246b coupled to four L shaped foam ducts 256 may provide gas media to avionics electronic equipment shelves 309, and 311.

Figure 4D:
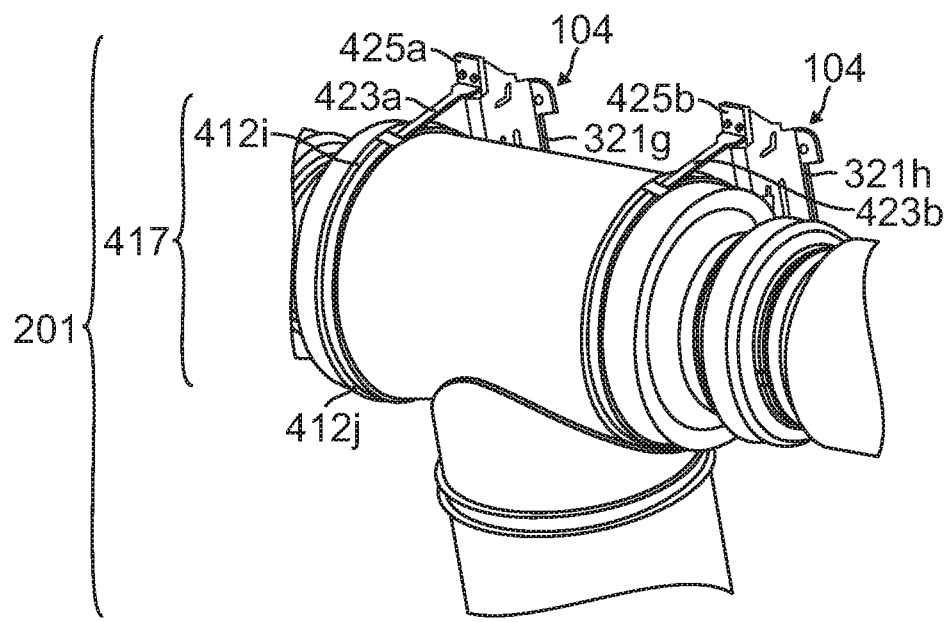
FIG. 4D illustrates a foam duct coupled to a tangential support bracket in accordance with an embodiment of the disclosure.
Figure 4E:
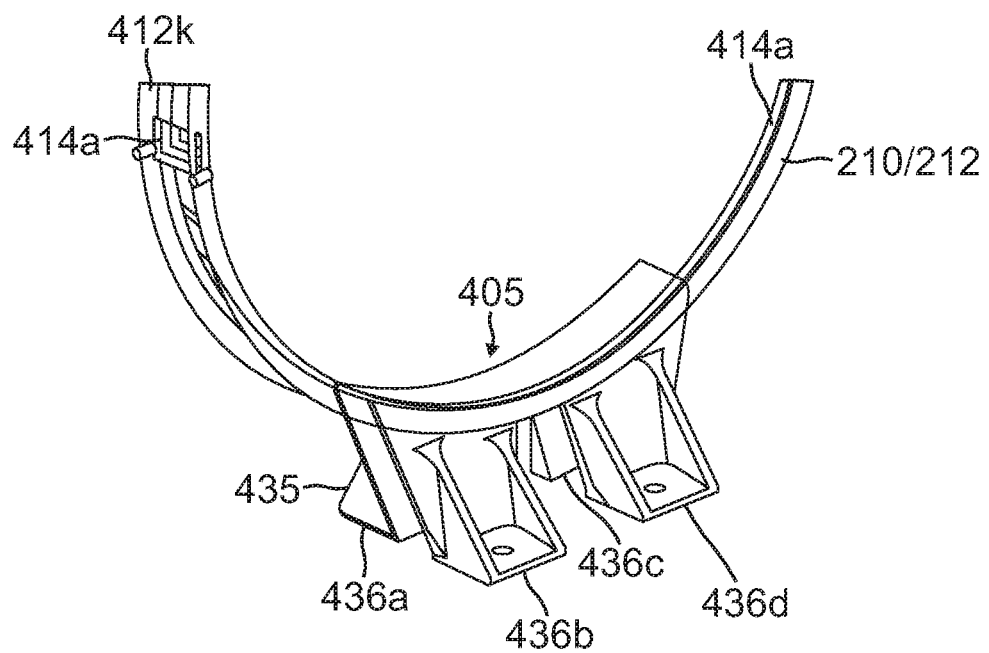
FIG. 4E illustrates a circumferential support bracket in accordance with an embodiment of the disclosure.

In some embodiments, avionics thermal conditioning section 202 may be coupled to each of corresponding tangential support brackets 321 and/or circumferential support brackets (e.g., circumferential support brackets 435 of FIG. 4E). Avionics electronic equipment shelf 305, shelf 307, shelf 309, and shelf 311 may be mechanically coupled to support structure 104 of engine section 103 and fixedly coupled by support structures 313a and 313b.

In the embodiment shown in FIG. 3C, avionics thermal conditioning section 202 may be coupled to an engine section thermal conditioning panel 315 at a thermal conditioning panel foam duct 333 to distribute gas media to components within engine section 103. Thermal conditioning panel foam duct 333 may be coupled to engine section thermal conditioning panel 315 at a thermal conditioning panel flange fastening system (e.g., such as panel flange fastening system 680 of FIG. 6B), as described herein. Engine section thermal conditioning panel 315 may be mechanically coupled to engine section 103 by brackets 317.

FIGS. 4A-4E illustrate views of various structural fastening systems and structural brackets in accordance with embodiments of the disclosure. FIG. 4A illustrates a support ring fastening system coupled to an outer surface of a foam duct in accordance with an embodiment of the disclosure. In the embodiment shown in FIG. 4A, foam duct 206h may be include a plurality of support ring 412 pairs (support rings individually labeled 412a through 412f). Two support rings 412 may be coupled end to end and the pair may encircle an outer surface 403 of foam duct 206h. Furthermore, each foam duct 206, 216, 226, 236, 246, and/or 256 may include two or more pairs of support rings 412. In other embodiments, more than or fewer than two support rings 412 may be used to encircle the outer surface of foam ducts 206, 216, 226, 236, 246, and/or 256.

FIG. 4B illustrates a structural slip-fit fastening system 210 (e.g., a first structural fastening system) and a structural fixed fastening system 212 (e.g., a second structural fastening system) in accordance with an embodiment of the disclosure. Structural slip-fit fastening system 210 and structural fixed fastening system 212 may be configured to fasten one or more foam ducts (e.g., foam duct 206, 216, 226, 236, 246, and/or 256) to support structure 104 to restrain movement of the foam duct. In this regard, fixed fastening system 212 may be configured to restrain movement of foam duct in both a radial and an axial direction. Slip-fit fastening system 210 may allow movement of foam duct in an axial direction and restrain movement in a radial direction.

In some embodiments, FIG. 4B may be implemented as slip-fit fastening system 210 (e.g., first structural fastening system). Slip-fit fastening system 210 includes two or more support rings 412 (individually labeled 412g and 412h) and a tie strap 414. Support rings 412g and 412h may be coupled to each other around a perimeter of foam duct 206i. At least one support ring 412 is adhesively bonded to an outer surface 403 of foam duct 206i. At least one support ring 412 is free to move along the outer surface 403. Adhesively bonding only one support ring 412 restrains foam duct 206i movement in a radial direction and allows movement in an axial direction to allow for thermal expansion and contraction of foam duct 206i. Tie strap 414 encircles support rings 412g and 412h and a bracket (e.g., circumferential support bracket 435 of FIG. 4E) to couple foam duct 206i to the bracket, as described herein. Tie strap 414 may be selectively tightened to circumferentially couple foam duct 206i to the bracket.

In some embodiments, FIG. 4B may be implemented as fixed fastening system 212 (e.g., second structural fastening system). Fixed fastening system 212 includes two or more support rings 412 (individually labeled 412g and 412h) and a tie strap 414, similar to slip-fit fastening system 210. Support rings 412g and 412h may be coupled to each other around a perimeter of foam duct 206i. Support rings 412g and 412h may be adhesively bonded to outer surface 403 of foam duct 206i. Adhesively bonding support rings 412g and 412h restrains foam duct 206i movement in a radial and an axial direction. Tie strap 414 encircles support rings 412g and 412h and a bracket (e.g., circumferential support bracket 435 of FIG. 4E) to couple foam duct 206i to the bracket, as described herein. Tie strap 414 may be selectively tightened to couple foam duct 206i to the bracket.

In some embodiments, support ring 412 may be formed from a thermoplastic material utilizing an injection molded process. However, other materials may be used to form support ring 412, such as, for example, a metal alloy and/or a composite material. Furthermore, an additive manufacturing and/or other similar processes may be used to form support ring 412. In some embodiments, tie strap 414 may be formed from a metal alloy. However, other materials may be used for tie strap 414, such as a plastic and/or a composite material. Design and manufacturing cost savings may be realized by utilizing common parts and materials for slip-fit fastening system 210 and fixed fastening system 212.

Each foam duct (e.g., foam duct 206, 216, 226, 236, 246, and/or 256) may incorporate one or more slip-fit fastening systems 210 and/or fixed fastening systems 212. For example, in some embodiments, a foam duct (e.g., foam duct 206, 216, 226, 236, 246, and/or 256) may be fastened to support structure 104 with one slip-fit fastening system 210 and one fixed fastening system 212. In other embodiments, foam duct may be fastened to support structure 104 with two slip-fit fastening systems 210 and one fixed fastening system 212. Using slip-fit fastening systems 210 and fixed fastening systems 212 in combination to couple foam ducts to support structure 104 ensures adequate restraint of duct network 200 while allowing thermal expansion and contraction of the PVDF ducts (e.g., foam ducts 206, 216, 226, 236, 246, and/or 256), as described herein.

Referring back to FIG. 4A, in the embodiment shown, foam duct 206h may include at least two beaded cylindrical rings 406 (individually labeled 406a and 406b) to facilitate coupling bellows 208 to foam duct 206h. In this regard, each foam duct 206, 216, 226, 236, 246, and/or 256 of duct network 200 may include at least two cylindrical rings 406 to aid in coupling bellows 208 to foam ducts 206, 216, 226, 236, 246, and/or 256. Each of at least two beaded cylindrical rings 406 may be adhesively bonded to each corresponding end 401 and 402 of foam duct 206h at an outer surface 403.

In some embodiments, cylindrical ring 406 may include a first ring 407 with an inner diameter substantially equal to an outer diameter of foam duct 206, 216, 226, 236, 246, and/or 256 to fit over the foam duct. Cylindrical ring 406 may be adhesively bonded to foam duct 206h (and also foam duct 206, 216, 226, 236, 246, and/or 256) at first ring 207. Cylindrical ring 406 may include a second ring 409 with an inner diameter substantially equal to an inner diameter of foam duct 206, 216, 226, 236, 246, and/or 256 to facilitate travel of gas media through the foam duct. Second ring 409 may include a flat ridge 410 with an outer diameter substantially equal to an inner diameter of bellows 208, and a beaded lip 411 at an outer edge of flat ridge 410 to facilitate coupling foam bellows 208 to cylindrical ring 406, as described herein.

In some embodiments, beaded cylindrical ring 406 may be formed from a thermoplastic material utilizing an injection molded process. However, other materials may be used to form cylindrical ring 406, such as, for example, a metal alloy and/or a composite material. Furthermore, an additive manufacturing process and/or other similar processes may be used to form cylindrical ring 406.

FIG. 4C illustrates a duct connection fastening system 214 in accordance with an embodiment of the disclosure. In general, duct connection fastening system 214 may be used to couple two foam ducts of duct network 200. Duct connection fastening system 214 may include a beaded cylindrical ring 406c and a hose band clamp 415. In one example, beaded cylindrical ring 406c may be adhesively bonded to one of more ends of foam duct 246. Flat ridge 410c of cylindrical ring 406c may include an outer diameter substantially equal to an inner diameter of L shaped foam duct 256. L shaped foam duct 256 may fit over flat ridge 410c of cylindrical ring 406c. Hose band clamp 415 may encircle cylindrical ring 406c at flat ridge 410c to couple L shaped foam duct 256 to H shaped foam duct 246. Band clamp 415 may be selectively tightened to couple L shaped duct 256 to H shaped duct 246.

FIG. 4D illustrates a view of a foam duct coupled to a tangential support bracket 321 in accordance with an embodiment of the disclosure. In one example, gas media intake section 201 may be coupled to support structure 104, in part, by fixed tangential fastening system 417. Fixed tangential fastening system 417 may include two or more support rings 412 (individually labeled 412i and 412j) and a cable saddle clamp 423 (individually labeled 423a and 423b). Support rings 412i and 412j may be adhesively bonded to an outer surface of a foam duct (e.g., such as tee foam duct 845 of FIG. 8). Cable saddle clamp 423 may be positioned within support rings 412i and 412j. Both ends of cable saddle clamp 423 may be coupled to tangential support bracket 321 (individually labeled 321g and 321h) to mechanically couple foam duct to tangential support bracket 321. Tangential support bracket 321 may include a flat surface to tangentially contact foam duct outer curved surface. Tangential support bracket 321 may be coupled to support structure 104. Cable saddle clamp 423 includes fastening hardware 425 (individually labeled 425a and 425b) on both ends to couple saddle clamp 423 to support bracket 321. Fixed tangential fastening system 417 may restrain foam duct in a radial and an axial direction.

FIG. 4E illustrates a circumferential support bracket 435 in accordance with an embodiment of the disclosure. Circumferential support bracket 435 may be used to couple foam ducts of duct network 200 (e.g., foam ducts 206, 216, 226, 236, 246, and/or 256) to support structure 104. Circumferential bracket 435 may include a curved top surface 405. Curvature of top surface 405 may be substantially similar to a curvature of support ring 412. Support ring 412k may be positioned on circumferential bracket 435 at top surface 405. Top surface 405 of circumferential support bracket 435 may substantially conform to a curvature of foam duct to cradle foam duct within bracket 435. Tie strap 414a may be routed within bracket 435 under top surface 405 and between leg members 436 (individually labeled 436a through 436d) to couple foam duct to bracket 435. Tie strap 414a may be selectively tightened to couple foam duct to bracket 435.

Figure 5A:
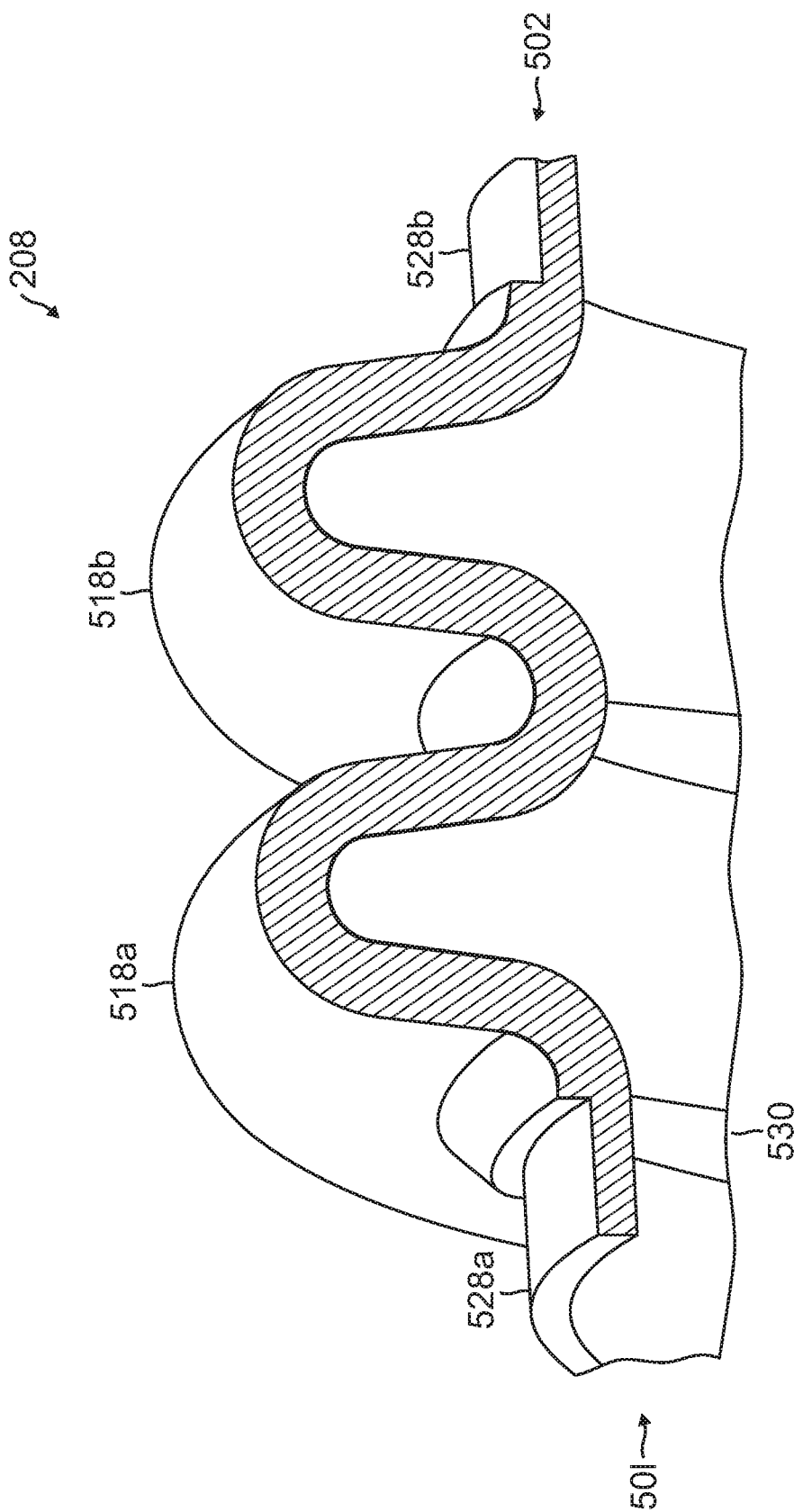
FIG. 5A illustrates a cross-section of a bellows in accordance with an embodiment of the disclosure.

FIGS. 5A-5C illustrate a bellows 208 and bellows fastening system 521 in accordance with embodiments of the disclosure. FIG. 5A illustrates a cross-section of a bellows 208 in accordance with an embodiment of the disclosure. In some embodiments, bellows 208 may include a convoluted cylindrical shape including a flat lip 528 (individually labeled 528a and 528b) on each end 501 and 502. Bellows 208 may include an inner diameter substantially equal to an outer diameter of beaded cylindrical ring 406. Bellows 208 may be formed to couple each of foam ducts of duct network 200 to each other. Bellows 208 may include a smooth inner surface 530. In some embodiments, bellows 208 may be formed from a polyvinylidene fluoride (PVDF) material with a thickness of approximately one-eighth inch to one-half inch. In other embodiments, bellows 208 may be formed from a rubber material and/or a flexible composite material.

Bellows 208 may include one or more bellow folds 518. In some embodiments, bellows 208 may include two bellow folds, 518a and 518b. In other embodiments, bellows 208 may include more than or less than two bellow folds 518. In some embodiments, bellows 208 may be formed as a straight bellows. In other embodiments, bellows 208 may be formed as an elbow with a plurality of folds 518. In some embodiments, bellows 208 may include a number of bellow folds 518 sufficient to form an elbow with an angle up to approximately ninety degrees.

FIG. 5B illustrates a bellows 208 coupled to two foam ducts 206 in accordance with an embodiment of the disclosure. As shown in FIG. 5B, bellows 208k may couple foam ducts 206k and 206l to each other. Bellows 208k may provide for expansion and contraction of foam ducts 206k and 206l within duct network 200. Thermal stresses associated with thermal cycling aerospace vessel 100 may cause PVDF foam ducts 206k and/or 206l to expand and/or contract in response to engine section 103 temperature extremes. Bellows 208 may provide for movement of ducts 206k and 206l within gap 503. In this regard, thermal stresses in the PVDF foam due its high coefficient of thermal expansion and exposure to temperatures extremes (e.g., temperature extremes of aerospace vessel 100) may be minimized by including bellows 208 to facilitate thermal expansion and contraction of foam ducts of duct network 200.

In some embodiments, cylindrical rings 406d and 406e may be adhesively bonded to foam ducts 206k and 206l, respectively, as described herein. Flat lip 528d of bellows 208k may be aligned with flat ridge 410d. Flat lip 528e of bellows 208k may be aligned with flat ridge 410e. Band clamps 521a and 521b may be placed around flat lips 528d and 528e, respectively. Band clamps 521a and 521b may be selectively tightened to couple foam ducts 206k and 206l to each other at cylindrical rings 406d and 406e, respectively.

FIG. 5C illustrates a bellows 208 coupled to a support structure 104 in accordance with an embodiment of the disclosure. In FIG. 5C, bellows 208l may be coupled to support structure 104 by fixed tangential fastening systems 417a and 417b. Foam ducts 206m and 206n may be coupled by bellows 208l by selectively tightening band clamps 521c and 521d to beaded cylindrical rings 406e and 406f, respectively. Fixed tangential fastening systems 417a and 417b may include two or more support rings 412 (individually labeled 412k through 412n) and a saddle clamp 423 (individually labeled 423c and 423d). Support rings 412 may be adhesively bonded to an outer surface of foam duct 206 (individually labeled 206m and 206n), as described herein. Saddle clamp 423 may be positioned over support rings 412. Saddle clamp fastening hardware 425 (individually labeled 425c and 425d) may secure saddle clamp 423 to support structure 104 to couple bellows 208l and foam ducts 206m and 206n to support structure 104. Fixed tangential fastening system 417 may restrain bellows 208l in a radial and an axial direction. In some embodiments, to allow expansion and/or contraction of the foam duct, one or more support rings may be allowed to move on the outer surface of the foam duct (e.g., foam duct 206m and/or 206n).

FIGS. 6A and 6B illustrate flange fastening systems in accordance with embodiments of the disclosure. FIG. 6A illustrates a foam duct flanged installation configuration in accordance with an embodiment of the disclosure. As shown in FIG. 6A, gas media intake section 201 may include a foam duct elbow 667 coupled to engine section 103 purge quick disconnect 302 to receive a gas media from an external source and to distribute gas media to components within engine section 103, as described herein.

In some embodiments, foam duct elbow 667 may include a duct flange fastening system 670 to mechanically couple foam duct elbow 667 to an opening within purge quick disconnect 302. Duct flange fastening system 670 may include a cylindrical ring 671 and a flange plate 672. Duct flange fastening system 670 may be adhesively bonded to foam duct elbow 667 at cylindrical ring 671. Cylindrical ring 671 may include a first ring 673 with an inner diameter substantially equal to an outer diameter of foam duct elbow 667 to fit over foam duct elbow 667. Cylindrical ring 671 may be adhesively bonded to foam duct elbow 667 at first ring 673. In some embodiments, flange plate 672 may be adhesively bonded to cylindrical ring 671. In other embodiments, flange plate 672 may be mechanically coupled to cylindrical ring 671 with fastening hardware. Duct flange fastening system 670 may be mechanically coupled to purge quick disconnect 302 with fastening hardware 675.

In some embodiments, foam duct elbow 667 may be coupled to straight foam duct 206o with bellows 208m. Foam duct elbow 667 and straight foam duct 206o may be mechanically coupled to support structure 104 with fixed tangential fastening systems 417c and 417d. Foam duct elbow 667 may include a foam support member 668 to provide an added rigidity to foam duct elbow 667. In some embodiments, foam duct elbow 667 may be formed from two or more foam components. In this regard, two or more foam components may be formed from bulk PVDF foam material and thermobonded to each other to form foam duct elbow 667 and/or other foam ducts of duct network 200. In some embodiments, foam components of foam duct elbow 667 and/or other foam ducts of duct network 200 may be formed using an injection molding process.

FIG. 6B illustrates a panel flange installation configuration in accordance with an embodiment of the disclosure. As shown in FIG. 6B, avionics thermal conditioning section 202 may include thermal conditioning panel foam duct 333 coupled to engine section thermal conditioning panel 315 to distribute gas media to components within engine section 103.

In some embodiments, thermal conditioning panel duct 333 may include a panel flange fastening system 680 to mechanically couple thermal conditioning panel duct 333 to engine section thermal conditioning panel 315. Panel flange fastening system 680 may include an oval ring 683 and a panel flange 682. Oval ring 683 of panel flange fastening system 680 may be adhesively bonded to thermal conditioning panel duct 333. In some embodiments, panel flange 682 may be adhesively bonded to oval ring 683. In other embodiments, panel flange 682 may be mechanically coupled to oval ring 683 with fastening hardware. Panel flange fastening system 680 may be mechanically coupled to engine section thermal conditioning panel 315 with fastening hardware 685.

Figure 7:
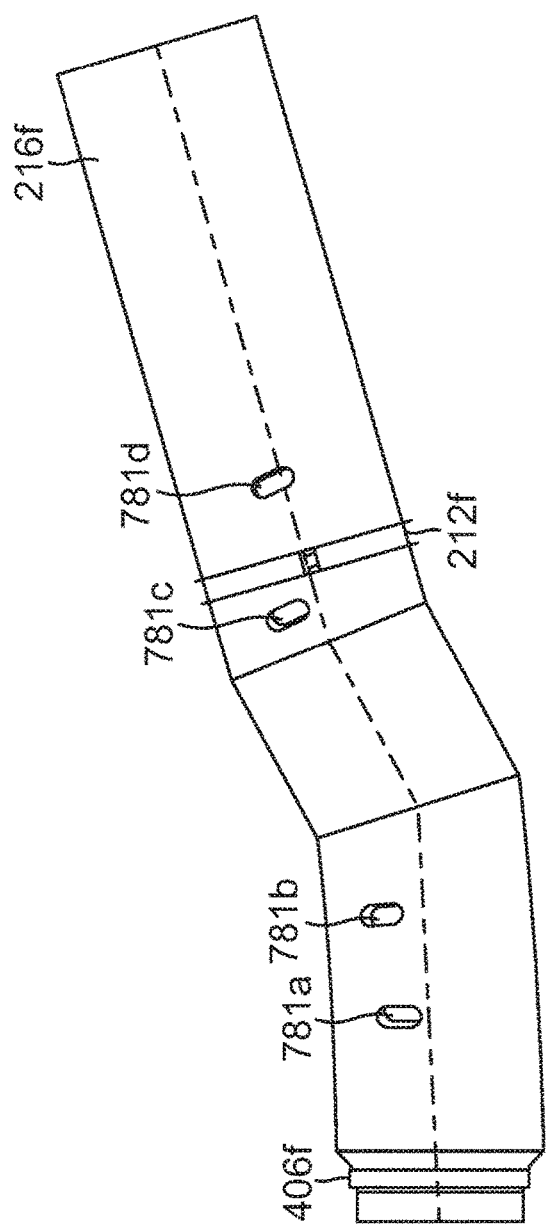
FIG. 7 illustrates orifices formed on a surface of a foam duct in accordance with an embodiment of the disclosure.

FIG. 7 illustrates orifices 781 formed on a surface of a foam duct 216 in accordance with an embodiment of the disclosure. As shown in FIG. 7, a plurality of orifices 781 (e.g., openings) may be formed along a surface of foam ducts of duct network 200 (e.g., inclined foam duct 216f). Orifices 781 (individually labeled 781a through 781d) may provide for a directional flow of a gas media as it travels through duct network 200. In some embodiments, orifices 781 may be offset at an angle from perpendicular to duct 216f surface. In this regard, angled orifices 781 sized and formed into duct sidewalls act as integrated guide vanes for directing gas media flow toward desired components. Cylindrical ring 406f may be used to couple inclined foam duct 216f to other foam ducts, as described herein. Structural fixed fastening system 212f may mechanically couple inclined foam duct 216f to support structure 104.

Figure 8:
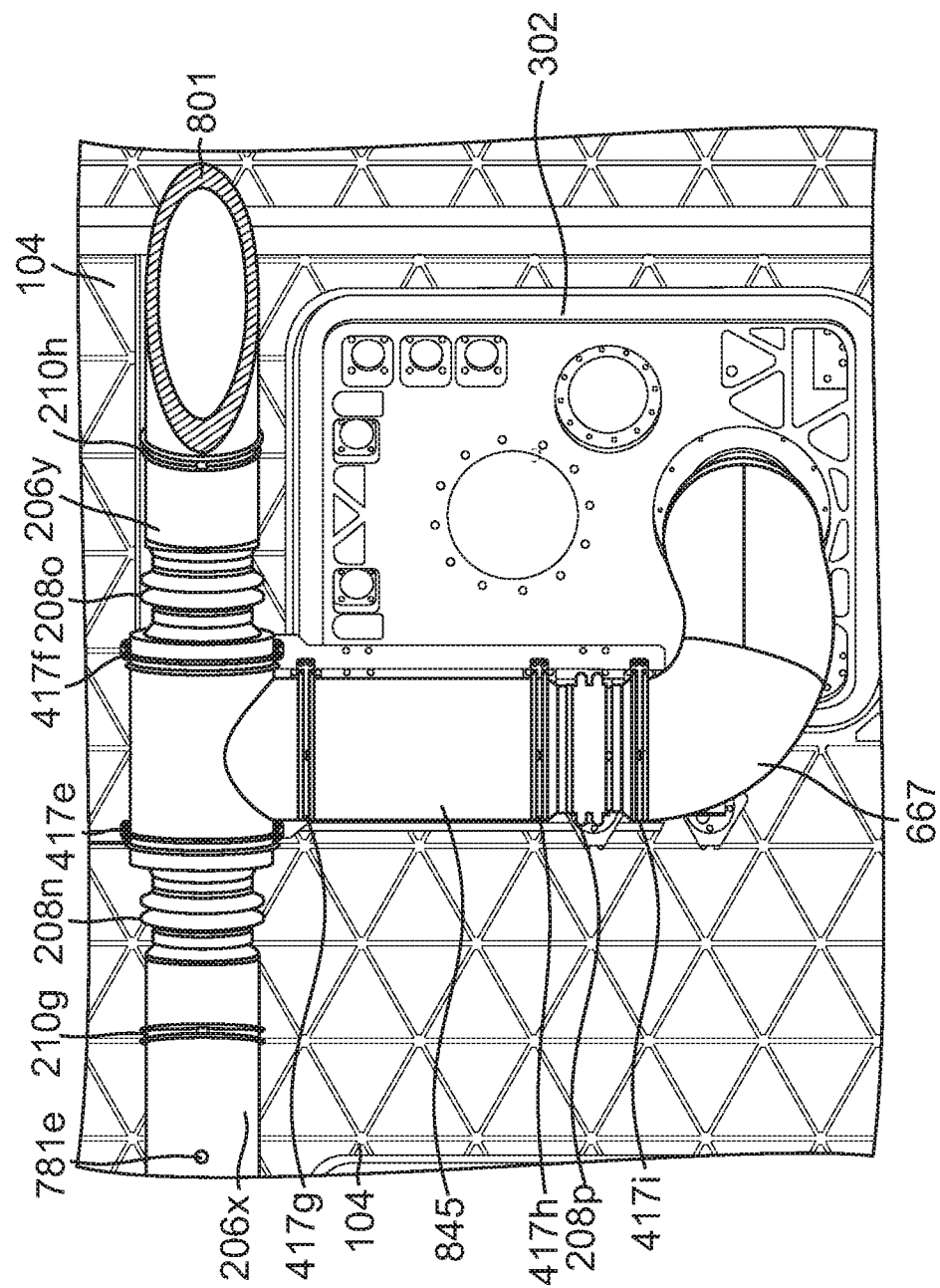
FIG. 8 illustrates a gas media intake section of a duct network in accordance with an embodiment of the disclosure.

FIG. 8 illustrates a gas media intake section 201 of a duct network 200 in accordance with an embodiment of the disclosure. In the embodiment shown in FIG. 8, duct elbow 667 may be coupled to purge quick disconnect 302. Bellows 208p may couple duct 667 to tee 845. Tangential support fastening system 417i may restrain elbow 667. Tangential support fastening systems 417h and 417g may restrain tee 845. Bellows 208n may couple tee 845 to straight duct 206x. Slip-fit fastening system 210g may restrain duct 206x. Duct 206x may include orifice 781e. Bellows 208o may couple straight duct 206y to tee 845. Tangential support fastening systems 417e and 417f may restrain tee 845 to support structure 104. Slip-fit fastening system 210h may restrain duct 206y. FIG. 8 includes a cutaway view 801 of duct 206h.

Figure 9:
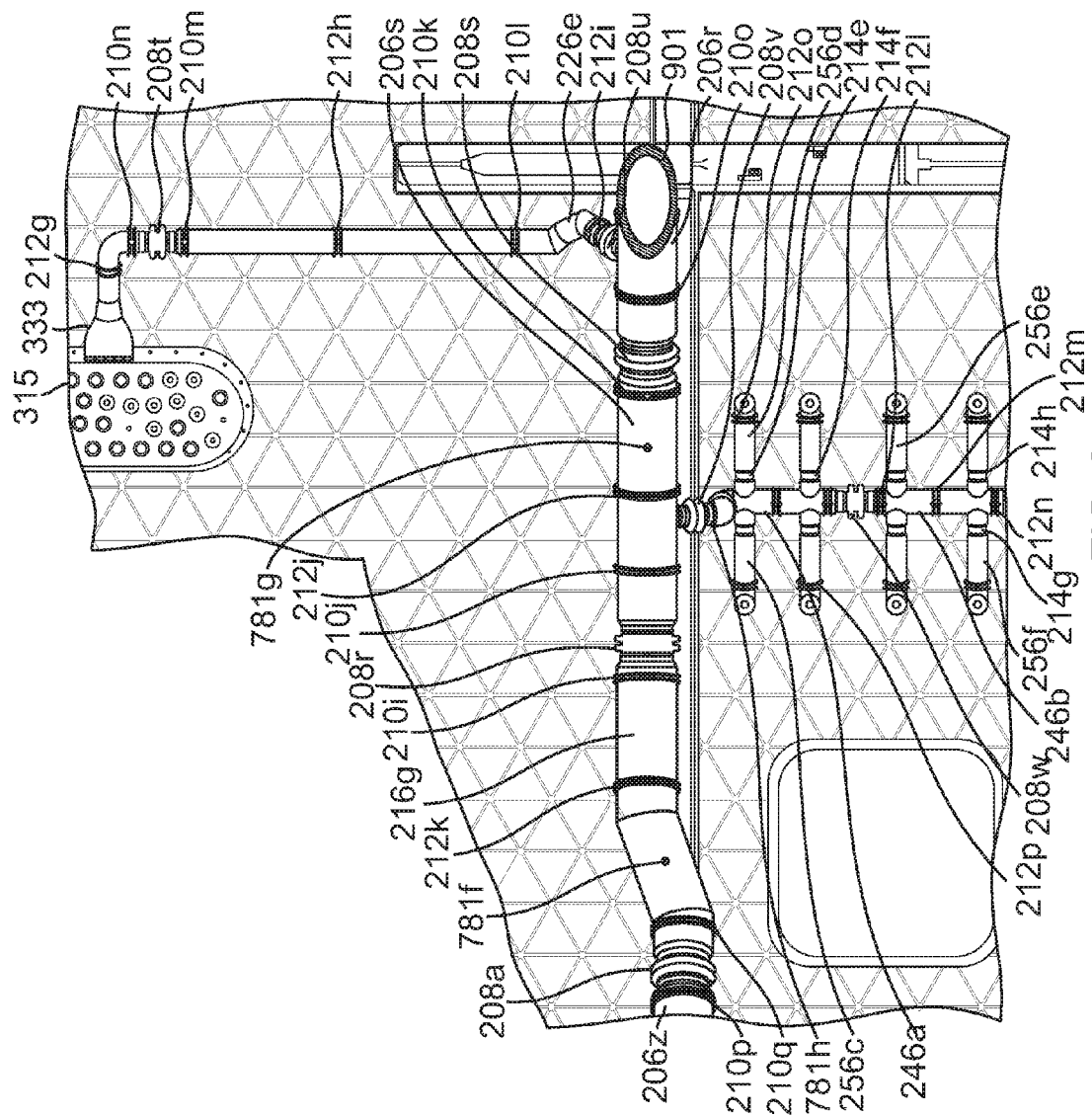
FIG. 9 illustrates an avionics thermal conditioning section of a duct network in accordance with an embodiment of the disclosure.

FIG. 9 illustrates an avionics thermal conditioning section 202 of a duct network 200 in accordance with an embodiment of the disclosure. In the embodiment shown in FIG. 9, slip-fit fastening system 210p may restrain straight duct 206z. Bellows 208q may couple straight duct 206z to inclined duct 216g. Slip-fit fastening systems 210q and 210i and fixed fastening system 212k may restrain inclined duct 216g. Inclined duct 216g may include orifice 781f. Bellows 208r may couple inclined duct 216g to straight duct 206s. Straight duct 206s may include orifice 781g. Slip-fit fastening systems 210k and 210j and fixed fastening system 212j may restrain straight duct 206s. Bellows 208s may couple straight ducts 206s and 206r. Slip-fit fastening system 210o may restrain straight duct 206r.

Bellows 208v may couple straight duct 206s to H shaped duct 246a. H shaped duct 246a may include orifice 781h. Duct connection fastening systems 214 (individually labeled 214e and 214f) may couple H shaped duct 246a to L shaped ducts 256 (individually labeled 256c and 256d). Bellows 208w may couple H shaped duct 246a to H shaped duct 246b. Duct connection fastening system 214 (individually labeled 214g and 214h) may couple H shaped duct 246b to L shaped ducts 256 (individually labeled 256e and 256f). Fixed fastening systems 212 (individually labeled 212l through 212p) may restrain H shaped ducts 246a and 246b and L shaped ducts 256 (individually labeled 256c through 256f).

Bellows 208u may couple straight duct 206r to elbow 226e. Slip-fit fastening systems 210l and 210m and fixed fastening systems 212h and 212i may restrain elbow 226e. Bellows 208t may couple elbow 226e to thermal conditioning panel foam duct 333. Thermal conditioning panel duct 333 may be restrained by fixed fastening system 212g and slip-fit fastening system 210n. Thermal conditioning panel foam duct 333 may be coupled to engine section thermal conditioning panel 315. FIG. 9 includes a cutaway view 901 of duct 206r.

Figure 10:
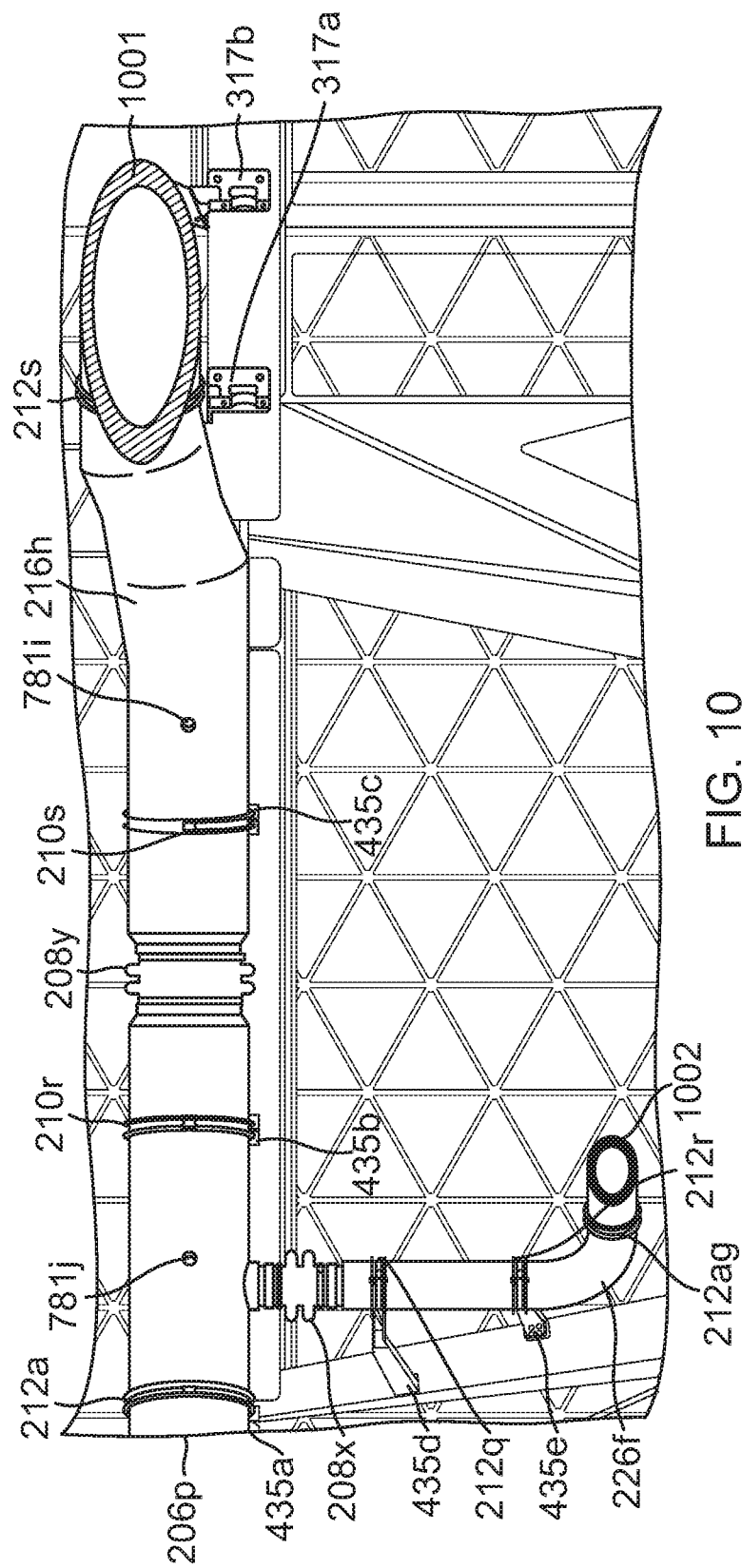
FIG. 10 illustrates an engine controller thermal conditioning section of a duct network in accordance with an embodiment of the disclosure.

FIG. 10 illustrates an engine controller thermal conditioning section 203 of a duct network 200 in accordance with an embodiment of the disclosure. In the embodiment shown in FIG. 10, straight duct 206p may be restrained to support structure 104 by fixed fastening system 212a and slip-fit fastening system 210r. Fixed fastening system 212a may be coupled to support structure 104 by circumferential support bracket 435a. Slip-fit fastening system 210r may be coupled to support structure 104 by circumferential support bracket 435b. Straight duct 206p may include orifice 781j. Bellows 208x may couple straight duct 206p to elbow 226f. Elbow 226f may be restrained by fixed fastening systems 212q, 212r, and 212ag. Fixed fastening system 212q may be coupled to support structure 104 by circumferential support bracket 435d. Fixed fastening system 212r may be coupled to support structure 104 by circumferential support bracket 435e. FIG. 10 includes a cutaway view 1002 of elbow 226f.

Bellows 208y may couple straight duct 206p and inclined duct 216h. Inclined duct 216h may include orifice 781i. Slip-fit fastening system 210s and fixed fastening system 212s may restrain inclined duct 216h. Slip-fit fastening system 210s may be coupled to support structure 104 by circumferential support bracket 435c. Brackets 317a and 317b may be coupled to inclined duct 216h and support structure 104 to restrain inclined duct 216h. FIG. 10 includes a cutaway view 1001 of inclined duct 216h.

Figure 11:
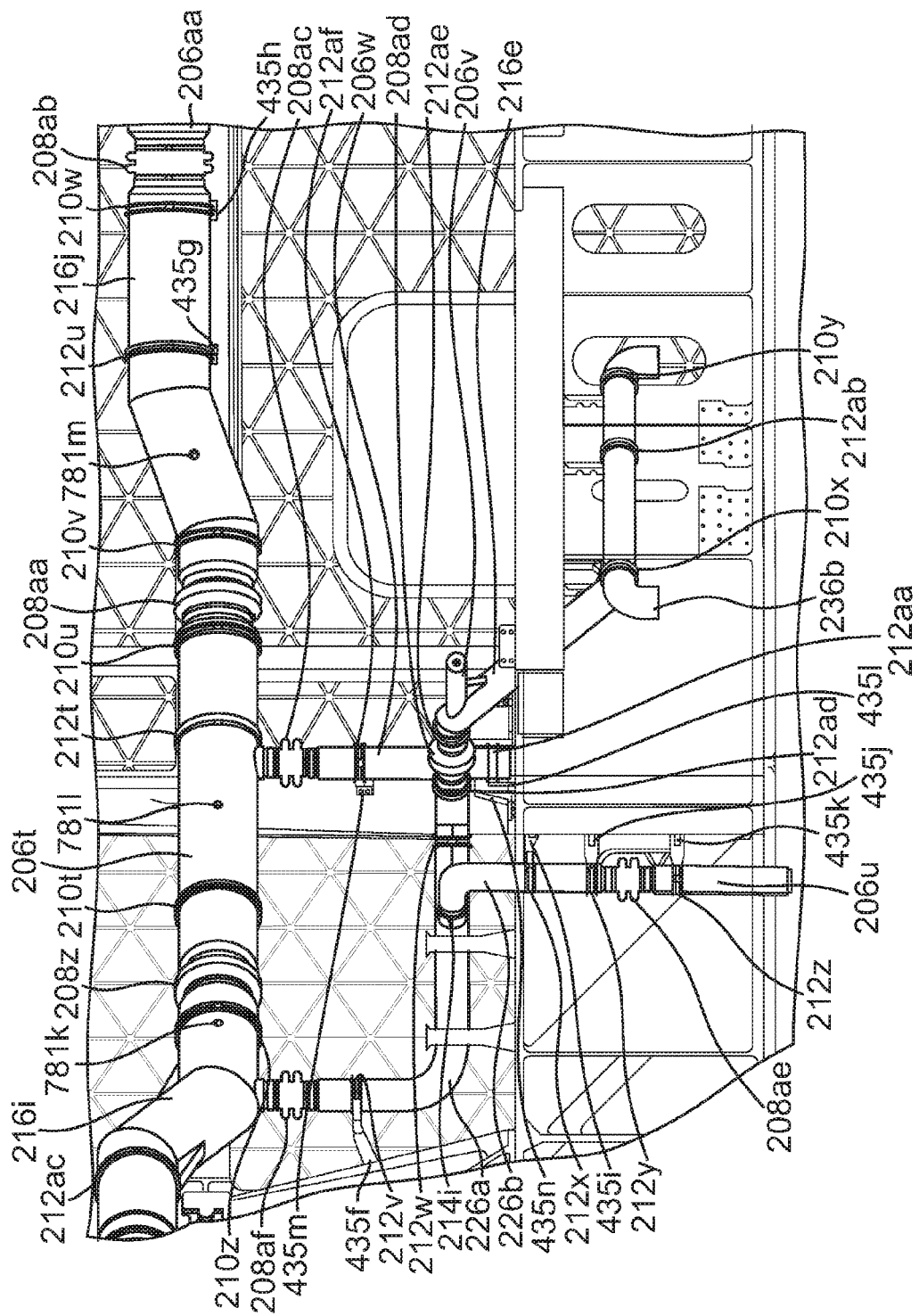
FIG. 11 illustrates an engine controller, electronics, and bulk area conditioning section of a duct network in accordance with an embodiment of the disclosure.

FIG. 11 illustrates an engine controller, electronics, and bulk area thermal conditioning section 204 of a duct network 200 in accordance with an embodiment of the disclosure. In the embodiment shown in FIG. 11, bellows 208z may couple inclined duct 216i to straight duct 206t. Slip-fit fastening system 210z and fixed fastening system 212ac may restrain inclined duct 216i. Inclined duct 216i may include orifice 781k. Bellows 208af may couple inclined duct 216i to elbow 226a. Fixed fastening system 212v may restrain elbow 226a. Fixed fastening system 212v may be coupled to support structure 104 by circumferential support bracket 435f. Fixed fastening system 212w may restrain elbow 226a. Duct connection fastening system 214i may couple elbow 226a to elbow 226b. Fixed fastening systems 212x and 212y may restrain elbow 226b. Fixed fastening system 212x may be coupled to support structure 104 by circumferential support bracket 435i. Fixed fastening system 212y may be coupled to support structure 104 by circumferential support bracket 435j. Bellows 208ae may couple elbow 226b to straight duct 206u. Fixed fastening system 212z may restrain elbow 226b. Fixed fastening system 212z may be coupled to support structure 104 by circumferential support bracket 435k.

Bellows 208ad may couple elbow 226b to inclined duct 216e. Inclined duct 216e may include a straight duct protrusion 206v formed on an outer surface of inclined duct 216e. Fixed fastening system 212ad may restrain elbow 226b near bellows 208ad. Fixed fastening system 212ad may be coupled to support structure 104 by circumferential support bracket 435n. Fixed fastening system 212ae may restrain bellows 208ad near inclined duct 216e. Inclined duct 216e may be coupled to U shaped duct 236b. Slip-fit fastening systems 210x and 210y and fixed fastening system 212ab may restrain U shaped duct 236b.

Bellows 208ac may couple straight duct 206t to straight duct 206w. Fixed fastening systems 212af and 212aa may restrain straight duct 206w. Fixed fastening system 212af may be coupled to support structure 104 by circumferential support bracket 435m. Fixed fastening system 212aa may be coupled to support structure 104 by circumferential support bracket 435l.

Bellows 208aa may couple straight duct 206t to inclined duct 216j. Straight duct 206t may include orifice 781l. Slip-fit fastening systems 210t and 210u and fixed fastening system 212t may restrain straight duct 206t. Inclined duct 216j may include orifice 781m. Slip-fit fastening systems 210v and 210w and fixed fastening system 212u may restrain inclined duct 216j. Fixed fastening system 212u may be coupled to support structure 104 by circumferential support bracket 435g. Slip-fit fastening system 210w may be coupled to support structure 104 by circumferential support bracket 435h. Bellows 208ab may couple inclined duct 216j to straight duct 206aa.

Figure 12:
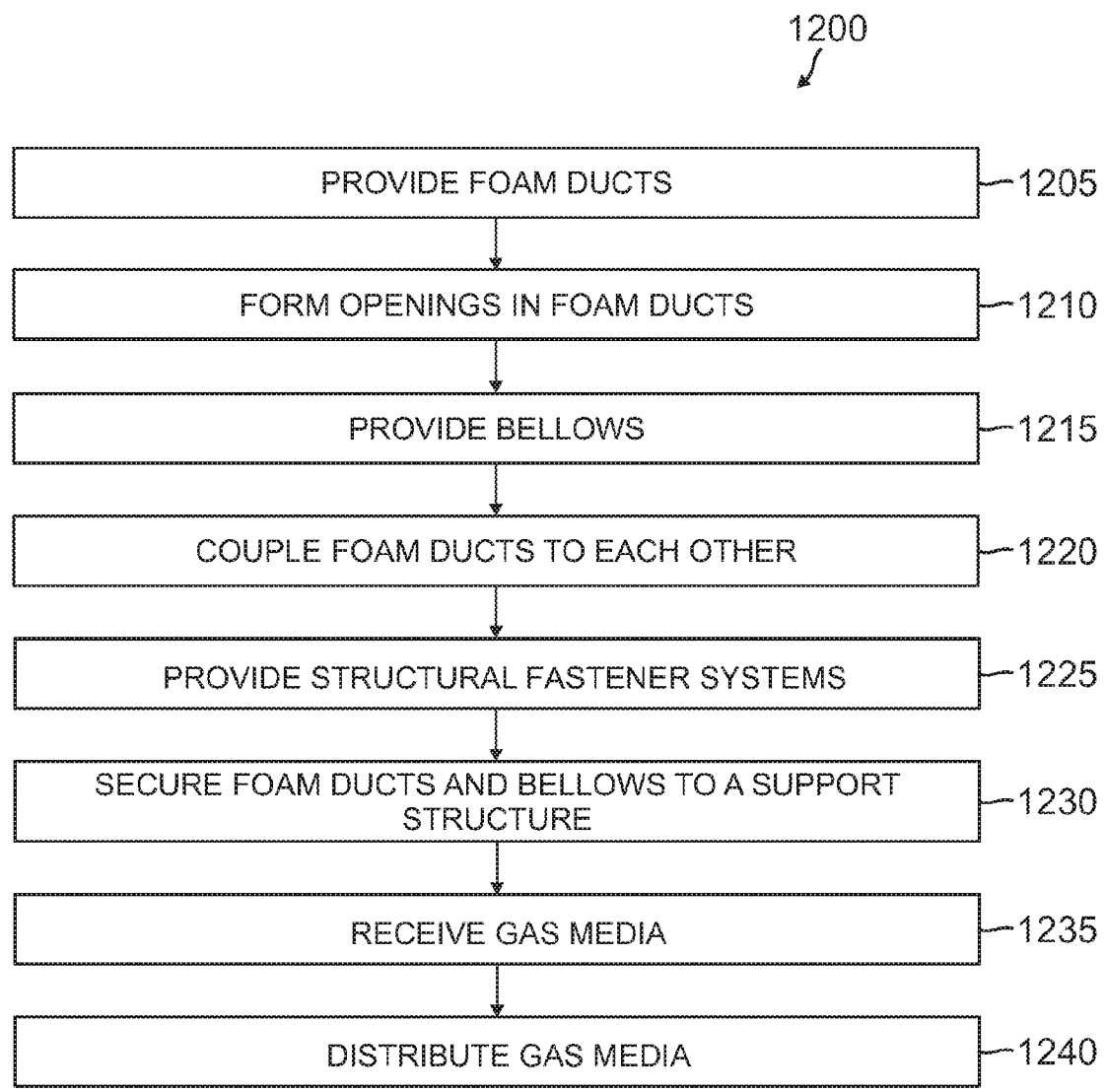
FIG. 12 illustrates a process of providing a duct network in accordance with an embodiment of the disclosure.

FIG. 12 illustrates a process of providing a duct network 200 in accordance with an embodiment of the disclosure. In block 1205, a plurality of foam ducts of duct network 200 may be provided. Foam ducts may be provided in a plurality of shapes, such as straight foam ducts 206, inclined foam ducts 216, elbow foam ducts 226, U shaped foam ducts 236, H shaped foam ducts 246, and L shaped foam ducts 256, for example. In some embodiments, foam ducts may be provided in complex shapes such as a thermal conditioning panel foam duct 333 and a tee foam duct 845. In some embodiments, foam ducts may be formed from a polyvinylidene fluoride (PVDF) material.

In block 1210, openings (e.g., orifices 781) may be formed in the foam ducts. Orifices 781 formed into foam duct sidewalls act as integrated guide vanes for directing gas media flow toward desired components. In block 1215, bellows 208 may be provided with an inner diameter substantially equal to an outer diameter of a beaded cylindrical ring 406 of foam ducts of duct network 200. In some embodiments, bellows 208 may be formed from a polyvinylidene fluoride (PVDF) material. In some embodiments, bellows 208 may include two bellow folds 518, however, more or fewer bellow folds 518 may be possible.

In block 1220, foam ducts of duct network 200 may be coupled to each other by placing bellows 208 between adjacent ends of two foam ducts and mechanically coupling bellows 208 to corresponding ends of foam ducts. In block 1225, a plurality of structural fastening systems may be provided. Structural fastening systems may include a structural slip-fit fastening system 210 (e.g., a first structural fastening system), a structural fixed fastening system 212 (e.g., a second structural fastening system), and a fixed tangential fastening system 417 to couple foam ducts and bellows 208 to a tangential support bracket 321 and/or a circumferential support bracket 435. Tangential support bracket 321 and circumferential support bracket 435 may be physically coupled to support structure 104.

Duct connection fastening system 214 may couple foam ducts to each other. A foam duct flange fastening system 670 may physically couple foam duct elbow 667 to a purge quick disconnect 302 to facilitate receiving a gas media through purge quick disconnect 302 to distribute gas media throughout duct network 200. A panel flange fastening system 680 may physically couple thermal conditioning panel foam duct 333 to engine section thermal conditioning panel 315 to facilitate distributing gas media to components within engine section 103.

In block 1230, foam ducts of duct network 200 and bellows 208 may be coupled to a support structure 104. A plurality of tangential support brackets 321 and/or circumferential support brackets 435 may be physically coupled to support structure 104. Tangential support brackets 321 and/or circumferential support brackets 435 may couple to structural slip-fit fastening systems 210, structural fixed fastening systems 212, and/or fixed tangential fastening system 417 to couple foam ducts and bellows 208 to support structure 104.

In block 1235, duct network 200 may receive a gas media from an external source. In some embodiments, gas media may be conditioned air. In other embodiments, gas media may be gaseous nitrogen. In block 1240, duct network 200 may distribute gas media to components within engine section 103.

In view of the above discussion, it will be appreciated that a duct network 200 implemented in accordance with various embodiments set forth herein may provide for improved gas media distribution without an increase in weight by providing PVDF foam ducts with improved thermal insulation. Impact of thermal stresses in the PVDF foam due its high coefficient of thermal expansion and extreme temperature exposures within an aerospace vessel may be minimized by including convoluted foam bellows 208 to facilitate thermal expansion and contraction. Structural slip-fit fastening systems 210 and structural fixed fastening systems 212 ensure adequate restraint of the duct network 200 while allowing thermal expansion and contraction of the PVDF ducts. Furthermore, angled orifices 781 sized and formed into the foam duct sidewalls act as integrated guide vanes for directing gas media flow toward desired components.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   a duct network comprising a plurality of foam ducts configured to distribute a gas media;
   a plurality of foam bellows configured to couple the foam ducts to each other to form the duct network; and
   a plurality of structural fastening systems configured to couple the foam ducts and/or the foam bellows to a support structure, wherein the structural fastening systems comprise:
      a plurality of first structural fastening systems comprising a slip-fit fastening system, wherein the slip-fit fastening system allows movement of the foam duct in an axial direction;
      a plurality of second structural fastening systems comprising a fixed fastening system, wherein the fixed fastening system restrains movement of the foam duct in a radial and the axial direction;
      a plurality of third structural fastening systems comprising a flange fastening system;
      a plurality of brackets configured to mechanically couple the structural fastening systems to the support structure; and
      wherein the first structural fastening system comprises two or more support rings and a tie strap, the support rings are coupled to each other around a perimeter of the foam duct, at least one support ring is adhesively bonded to an outer surface of the foam duct, at least one support ring is free to move along the outer surface, and the tie strap encircles the support rings and the bracket to couple the foam duct to the bracket.

2. The system of claim 1, wherein:
   the foam ducts comprise a polyvinylidene fluoride (PVDF) material;
   the foam ducts are cylindrical with an inner diameter approximately one and one-half inches to ten inches and an outer diameter approximately two and one-half inches to twelve inches; and
   wherein a foam duct sidewall thickness is approximately one-half inch to one inch.

3. The system of claim 1, further comprising:
   a plurality of openings each comprising an angled orifice formed along a surface of each of the plurality of foam ducts to provide for directional flow of the gas media.

4. The system of claim 1, further comprising:
a beaded cylindrical ring adhesively bonded to each end of the foam duct at an outer surface, wherein the beaded cylindrical ring comprises a thermoplastic material.

5. The system of claim 1, wherein the foam bellows comprise:
a polyvinylidene fluoride (PVDF) material;
a convoluted cylindrical shape comprising one or more foam bellow folds and a flat lip on each end with an inner diameter substantially equal to an outer diameter of a beaded cylindrical ring; and
wherein the foam bellows provide for expansion and/or contraction of the foam ducts within the duct network.

6. The system of claim 1, wherein:
the second structural fastening system comprises two or more support rings and a tie strap;
the support rings are coupled to each other around a perimeter of the foam duct;
the support rings are adhesively bonded to an outer surface of the foam duct; and
wherein the tie strap encircles the support rings and the bracket to couple the foam duct to the bracket.

7. The system of claim 1, wherein the brackets comprise a tangential support bracket and/or a circumferential support bracket, and wherein the structural fastening systems are configured to couple the foam ducts and/or the foam bellows to the support structure of an engine section of a launch vehicle.

8. A method of assembling the duct network of claim 1, the method comprising:
coupling at least two of the plurality of foam ducts to each other using at least one of the plurality of foam bellows; and
coupling the foam ducts and/or the foam bellows to the support structure using one or more structural fastening systems.

9. A method of using the system of claim 1, the method comprising:
receiving the gas media; and
distributing the gas media through the duct network.

10. A method of providing a duct network, the method comprising:
providing a plurality of foam ducts;
providing a plurality of foam bellows;
providing a plurality of structural fastening systems;
coupling the foam ducts to each other using the foam bellows; and
coupling the foam ducts and/or the foam bellows to a support structure using the structural fastening systems, wherein the structural fastening systems comprise:
a plurality of first structural fastening systems comprising a slip-fit fastening system, wherein the slip-fit fastening system allows movement of the foam duct in an axial direction;
a plurality of second structural fastening systems comprising a fixed fastening system;
a plurality of third structural fastening systems comprising a flange fastening system;
a plurality of brackets configured to mechanically couple the structural fastening systems to the support structure; and
wherein the first and second structural fastening systems each comprise two or more support rings and a tie strap, the support rings of each first and second structural fastening system are coupled to each other around a perimeter of the foam duct, at least one support ring of the first structural fastening system is free to move along an outer surface of the foam duct, the two or more support ring of the second structural fastening system are adhesively bonded to the outer surface of the foam duct, and the tie strap of each first and second structural fastening system encircles corresponding support rings and the bracket to couple the foam duct to the bracket.

11. The method of claim 10, wherein:
the foam ducts comprise a polyvinylidene fluoride (PVDF) material;
the foam ducts are cylindrical with an inner diameter approximately two inches to ten inches and an outer diameter approximately three inches to twelve inches; and
wherein a foam duct sidewall thickness is approximately one-half inch to one inch.

12. The method of claim 10, wherein:
the providing the foam ducts comprises forming a plurality of openings each comprising an angled orifice along a surface of each of the plurality of foam ducts to provide for directional flow of a gas media.

13. The method of claim 10, wherein:
the providing the foam ducts comprises adhesively bonding a beaded cylindrical ring to each end of the foam duct at an outer surface; and
the beaded cylindrical ring comprises a thermoplastic material.

14. The method of claim 10, wherein:
the foam bellows comprise a convoluted cylindrical shape comprising one or more foam bellow folds and a flat lip on each end with an inner diameter substantially equal to an outer diameter of a beaded cylindrical ring;
the foam bellows comprise a polyvinylidene fluoride (PVDF) material; and
wherein the foam bellows provide for expansion and/or contraction of the foam ducts within the duct network.

15. The method of claim 10, wherein the coupling the foam ducts to each other comprises:
placing the foam bellows around a beaded cylindrical ring to align a flat lip of the foam bellows and a bead of the beaded cylindrical ring; and
physically coupling the flat lip of the foam bellows to the bead of the beaded cylindrical ring.

16. The method of claim 10, wherein:
the coupling comprises coupling the foam ducts and/or the foam bellows to the support structure using one or more structural fastening systems, and wherein the support structure is coupled to an engine section of a launch vehicle.

17. A system comprising:
a duct network comprising a plurality of foam ducts configured to distribute a gas media;
a plurality of foam bellows configured to couple the foam ducts to each other to form the duct network; and
a plurality of structural fastening systems configured to couple the foam ducts and/or the foam bellows to a support structure, wherein the structural fastening systems comprise:
a plurality of first structural fastening systems comprising a slip-fit fastening system, wherein the slip-fit fastening system allows movement of the foam duct in an axial direction;
a plurality of second structural fastening systems comprising a fixed fastening system, wherein the fixed fastening system restrains movement of the foam duct in a radial and the axial direction;

a plurality of third structural fastening systems comprising a flange fastening system;

a plurality of brackets configured to mechanically couple the structural fastening systems to the support structure; and wherein the second structural fastening system comprises two or more support rings and a tie strap, the support rings are coupled to each other around a perimeter of the foam duct, the support rings are adhesively bonded to an outer surface of the foam duct, and the tie strap encircles the support rings and the bracket to couple the foam duct to the bracket.

18. The system of claim 17, wherein:

the foam ducts comprise a polyvinylidene fluoride (PVDF) material;

the foam ducts are cylindrical with an inner diameter approximately one and one-half inches to ten inches and an outer diameter approximately two and one-half inches to twelve inches; and wherein a foam duct sidewall thickness is approximately one-half inch to one inch.

19. The system of claim 17, further comprising:

a plurality of openings each comprising an angled orifice formed along a surface of each of the plurality of foam ducts to provide for directional flow of the gas media.

20. The system of claim 17, wherein the foam bellows comprise:

a polyvinylidene fluoride (PVDF) material;

a convoluted cylindrical shape comprising one or more foam bellow folds and a flat lip on each end with an inner diameter substantially equal to an outer diameter of a beaded cylindrical ring; and wherein the foam bellows provide for expansion and/or contraction of the foam ducts within the duct network.

\* \* \* \* \*